(12) United States Patent
Xu et al.

(10) Patent No.: US 10,332,025 B2
(45) Date of Patent: Jun. 25, 2019

(54) PROXIMAL GRADIENT METHOD FOR HUBERIZED SUPPORT VECTOR MACHINE

(71) Applicant: Siemens Aktiengesellschaft, Munich (DE)

(72) Inventors: Yangyang Xu, Houston, TX (US); Ioannis Akrotirianakis, Princeton, NJ (US); Amit Chakraborty, East Windsor, NJ (US)

(73) Assignee: Siemens Aktiengesellschaft, Munich (DE)

( * ) Notice: Subject to any disclaimer, the term of this patent is extended or adjusted under 35 U.S.C. 154(b) by 619 days.

(21) Appl. No.: 14/642,904

(22) Filed: Mar. 10, 2015

(65) Prior Publication Data

US 2015/0262083 A1    Sep. 17, 2015

Related U.S. Application Data

(60) Provisional application No. 61/951,005, filed on Mar. 11, 2014.

(51) Int. Cl.
*G06F 15/18* (2006.01)
*G06N 20/00* (2019.01)

(52) U.S. Cl.
CPC .................. *G06N 20/00* (2019.01)

(58) Field of Classification Search
CPC .................................................. G06N 99/005
See application file for complete search history.

(56) References Cited

U.S. PATENT DOCUMENTS

| 7,542,959 | B2 * | 6/2009 | Barnhill | G06F 19/24 706/48 |
| 8,719,194 | B2 | 5/2014 | Qin et al. | |
| 2003/0158830 | A1 * | 8/2003 | Kowalczyk | G06N 99/005 706/16 |
| 2003/0225526 | A1 * | 12/2003 | Golub | G06F 19/20 702/19 |
| 2008/0183646 | A1 * | 7/2008 | Harris | G06K 9/6269 706/12 |
| 2011/0016065 | A1 * | 1/2011 | Chapelle | G06N 99/005 706/12 |

OTHER PUBLICATIONS

Training a Support Vector Machine in the Primal Olivier Chapelle, Aug. 30, 2006.*

(Continued)

*Primary Examiner* — Scott A. Waldron
*Assistant Examiner* — Ababacar Seck

(57) ABSTRACT

The Support Vector Machine (SVM) has been used in a wide variety of classification problems. The original SVM uses the hinge loss function, which is nondifferentiable and makes the problem difficult to solve in particular for regularized SVMs, such as with $l_1$-norm. The Huberized SVM (HSVM) is considered, which uses a differentiable approximation of the hinge loss function. The Proximal Gradient (PG) method is used to solving binary-class HSVM (BHSVM) and then generalized to multi-class HSVM (MHSVM). Under strong convexity assumptions, the algorithm converges linearly. A finite convergence result about the support of the solution is given, based on which the algorithm is further accelerated by a two-stage method.

20 Claims, 4 Drawing Sheets

(56) References Cited

OTHER PUBLICATIONS

A novel feature selection method for twin support vector machine Lan Bai, Zhen Wanga, Yuan-Hai Shao, Nai-Yang Deng, Jan. 2014.*
Proximal Algorithms 2013 Neal Parikh, Stephen Boyd.*
Hybrid Huberized Support Vector Machines for Microarray Classification—2007 Li Wang, Ji Zhu, Hui Zou.*
Support Vector Machines for Additive Models:Consistency and Robustness—2010 Andreas Christmann and Robert Hable Department of Mathematics—University of Bayreuth.*
Yurii Nesterov; "Gradient Methods for Minimizing Composite Objective Function", CORE, Discussion Papers, 2007.
Amir Beck and Marc Teboulle, "A Fast Iterative Shrinkage-Thresholding Algorithm for Linear Inverse Problems", SIAM Journal on Imaging Sciences, 2(1):183-202, 2009.
Quoc Tran-Dinh, et al.; "Composite Convex Minimization Involving Self-Concordant-Like Cost Functions"; Laboratory for Information and Inference Systems (LIONS) EPFL, Lausanne, Switzerland. Feb. 4, 2015.
Yang Zang, et al., "Distributed Online Outlier Detection in Wireless Sensor Networks Using Ellipsoidal Support Vector Machine", Ad Hoc Networks, Journal Homepage, 2012.
John C. Platt, et al.; "Large Margin DAGs for Multiclass Classification"; Advances in Neural Information Processing Systems, 12(3):547-553, 2000.
Hao H. Zhang, et al; "Variable Selection for the Multicategory SVM via Adaptive Sup-norm Regularization", Electric Journal of Statistics, 2:149-167, 2008.
Hui Zou, et al., "Regularization and Variable Selection via the Elastic Net", Journal of the Royal Statistical Society, Series B, 67(1):301-320, 2005.
Yu Nesterov, "Introductory Lectures on Convex Programming", vol. 1, Basic Course, Jul. 2, 1998.
Bernd Heisele, et al.; "Face Recognition With Support Vector Machines: Global Versus Component-based Approach"In Computer Vision, 2001, ICCV 2001. Proceedings Eighth IEEE International Conference on vol. 2, pp. 688-694, IEEE, 2001.
Elaine T. Hale, et al.; "Fixed-Point Continuation for L1-Minimization: Methodology and Convergence"; SIAM J. Optim., 19(3):1107-1130, 2008.
Yi Yang, et al.; "An Efficient Algorithm for Computing the HHSVM and Its Generalizations"; Journal of Computational and Graphical Statistics, 22(2):396-415, 2013.
Li Wang, et al.; "The Doubly Regularized Support Vector Machine", Statistica Sinica, 16(2):589, 2006.
Lifeng Wang, et al.; "On L1-Norm Multi-Class Support Vector Machines: Methodology and Theory". Journal of the American Statistical Association, 102(478):583-594, 2007.
Simon Lacoste-Julien, et al. "Block-Coordinate Frank-Wolfe Optimization for Structural SVMs"; Proceedings of the 30th International Conference on Machine Learning, Atlanta, Ga. USA, JMLR: W&CP, vol. 28, 2013.
Rong-En Fan et al., "LIBLINEAR: A Library for Large Linear Classification", The Journal of Machine Learning Research, 9:1871-1874, 2008.
Y. Lee, et al.; "Multicategory Support Vector Machines: Theory and Application to the Classification of Microarray Data and Satellite Radiance Data", Journal of the American Statistical Association, 99(465):67-81, 2004.
R. Tibshirani, "Regression Shrinkage and Selection via the Lasso", Journal of the Royal Statistical Society, Series B, 58 (1): 267-288, 1996.
V. Sindhwani et al., "Large Scale Semi-supervised Linear SVMs", Department of Computer Science, University of Chicago, Mar. 29, 2006.
Qi Li, et al., "Parallel Multitask Cross Validation for Support Vector Machine Using GPU", Journal of Parallel and Distributed Computing, 73(3):293-302, 2013.
M.P.S. Brown et al., "Knowledge-based analysis of Microarray Gene Expression Data by Using Support Vector Machines", Proceedings of the National Academy of Sciences, 97(1): 262, 2000.
Hua Ouyang, et al., "Stochastic Alternating Direction Method of Multipliers", In Proceedings of the 30th International Conference of Machine Learning, pp. 80-88, 2013.
Chih-Wei Hsu, et al., "A Comparison of Methods for Multi-class Support Vector Machines", Neural Networks, IEEE Transactions on, 13(2):415-425, 2002.
Gui-Bo Ye, et al., "Efficient Variable Selection in Support Vector Machines via the Alternating Direction Method of Multipliers", In Proceedings of the International Conference of Artificial Intelligence and Statistics, 2011.
Yangyang Xu, et al., "Block Coordinate Descent Method for Regularized Multi-convex Optimization", M.A. Thesis, Rice University, Nov. 2012.
Kwang In Kim, et al., "Support Vector Machines for Texture Classification", Pattern Analysis and Machine Intelligence, IEEE Transaction on, 24(11): 1542-1550, 2002.
Janez Demsar, "Statistical Comparisons of Classifiers Over Multiple Data Sets", The Journal of Machine Learning Research, 7: 1-30, 2006.
Li Wang, et al., "Hybrid Huberized Support Vector Machines for Microarray Classification", Proceedings of the 24th International Conference on Machine Learning, Corvallis, OR, 2007.
Alex J. Smola, et al., "A Tutorial on Support Vector Regression", NeuroCOLT Technical Report TR-98-030, Sep. 2003.
Jun-Tao Li, et al., "Huberized Multiclass Support Vector Machine for Microarray Classification", Acta Automatica Sinica, vol. 36 (3): 399-405, 2010.
Jan Luts, et al., "A Tutorial on Support Vector Machine-based Methods for Classification Problems in Chemometrics", Analytica Chimica Acta 665, 129-145, 2010.

* cited by examiner

PROXIMAL GRADIENT METHOD FOR HUBERIZED SUPPORT VECTOR MACHINE

CROSS-REFERENCE TO RELATED APPLICATIONS

This application claims the benefit of United States provisional patent application entitled "PROXIMAL GRADIENT METHOD FOR HUBERIZED SUPPORT VECTOR MACHINE" filed on Mar. 11, 2014 and assigned Ser. No. 61/951,005, the contents of which is hereby incorporated by reference in its entirety herein.

BACKGROUND OF THE INVENTION

1. Field of the Invention

The invention relates generally to solving classification problems. More specifically, the invention addresses the use of a support vector machine to solve classification problems with sample data having a large number of correlated features that can be grouped together, such as in medical image analysis.

2. Description of the Prior Art

The original linear support vector machine (SVM) aims to find a hyperplane that separates a collection of data points. Since it was proposed, the SVM has been widely used for binary classifications, such as texture classification, gene expression data analysis and face recognition. Mathematically, given a set of samples $\{x_i\}_{i=1}^n$ in p-dimensional space and each $x_i$ attached with a label $y_i \in \{+1, -1\}$, the linear SVM learns a hyperplane $(w^*)^T x + b^* = 0$ from the training samples. A new data point x can be categorized into the "+1" or "−1" class by inspecting the sign of $(w^*)^T x + b^*$.

The binary-class SVM (B-SVM) has been generalized to multicategory classifications to tackle problems where the data points belong to more than two classes. The initially proposed multi-class SVM (M-SVM) methods construct several binary classifiers, such as "one-against-all," "one-against-one," and "directed acyclic graph SVM." These M-SVMs may suffer from data imbalance; namely, some classes have far fewer data points than others, which can result in inaccurate predictions. One alternative is to put all the data points together in one model, which results in the so-called "all-together" M-SVMs. The "all-together" M-SVMs train multi-classifiers by considering a single large optimization problem.

A need exists, however, for techniques to assure that both the binary and the multiclass methods converge linearly, and to reduce the run-time of the models.

Medical images such as X-rays images, CAT scans and MRI images provide physicians with non-intrusive techniques for the diagnosis of a wide variety of medical conditions. The analysis of those images often involves the classification of the image as indicating one of two medical conditions, or as indicating one of a larger number of medical conditions.

Manual analysis of medical images is complex and time consuming, and requires experts with extensive experience. For those reasons, computer learning techniques and classification methods have been used to identify medical conditions using images. The classification methods, however, suffer from difficulties with convergence and with long run times, because of the extremely high dimensionality that is typical of medical image classification problems. There is therefore a need for medical image analysis techniques that assure linear convergence and reduce the run-time of the models.

SUMMARY OF THE INVENTION

Accordingly, it is an object of the invention is to provide support vector machine classification models that are capable of solving classification problems with high dimensionality, while assuring convergence and reducing run time. It is another object to provide a classifier capable of classifying medical images.

These and other objects are achieved in one or more embodiments of the invention by a computer-implemented method for training a support vector machine classifier. A hinge loss term of a support vector machine model of the classifier is replaced with a differentiable approximation of the hinge loss term based on a Huber loss function, to produce a differentiable support vector machine model. A proximal gradient method is then applied to solve the differentiable support vector machine model, to produce updates for an algorithm for determining a separating hyperplane of the differentiable support vector machine model. The algorithm is then used to determine the separating hyperplane.

Another exemplary embodiment of the invention features a computer-implemented method for training a binary support vector machine classifier for classifying data items with high dimensionality. A set of n data items $x = x_1, x_2, \ldots, x_n$ is received, each data item being a vector with dimensionality m and associated labels $y_i \in \{+1, -1\}$. Also received are a plurality of support vector machine tuning parameters $\lambda_1$, $\lambda_2$, $\lambda_3$ and a parameter $\delta$ defining a vicinity around a non-differentiable point of a hinge loss function is approximated by a quadratic smooth function. A constant $L_f$ is computed such that the loss function of the binary support vector machine classifier is Lipschitz continuous.

The method then solves for a maximum margin separating hyperplane $u^* = (b^*, w^*)$ of the classifier by minimizing a function of the data items x and associated labels y:

$$\min_{b,w} \frac{1}{n} \sum_{i=1}^{n} \phi_H(y_i(b + x_i^T w)) + \lambda_1 \|w\|_1 + \frac{\lambda_2}{2} \|w\|_2^2 + \frac{\lambda_3}{2} b^2,$$

where $\phi_H$ is a Huberized hinge loss function having values defined by $$\phi_H(t) = \begin{cases} 0, & \text{for } t > 1, \\ \frac{(1-t)^2}{2\delta}, & \text{for } 1 - \delta < t \leq 1, \\ 1 - t - \frac{\delta}{2} & \text{for } t \leq 1 - \delta; \end{cases}$$

the minimizing comprising executing successive iterations k, each iteration resulting in a hyperplane $u^k$ closer to the maximum margin separating hyperplane $u^*$ than a previously found separating hyperplane $u^{k-1}$, each iteration comprising:

computing $\hat{u}^{k-1} = u^{k-1} + \omega_{k-1}(u^{k-1} - u^{k-2})$ wherein $\hat{u}$ is an intermediate hyperplane defined as a linear combination of hyperplanes found in two previous iterations and $\omega_{k-1} \leq 1$ is a weight given to hyperplane definitions of two immediately previous iterations;

updating a Lipschitz constant $L_k$ as $\min(\eta^{n_k}L_{k-1}, L_f)$, where $\eta > 1$ is a preselected counter, and $n_k$ is an integer computed to guarantee monotonic decrease of the hinge loss function and leads to convergence of the successive iterations;

updating the hyperplane $u^k$ as $$\begin{cases} b^k = \dfrac{L_k \hat{b}^{k-1} - \nabla_b f(\hat{u}^{k-1})}{L_k + \lambda_3} \\ w^k = \dfrac{1}{L_k + \lambda_2} S_{\lambda_1}(L_k \hat{w}^{k-1} - \nabla_w f(\hat{u}^{k-1})), \end{cases}$$

wherein the function $f$ is defined by:

$$f_i(b, w) = \phi_H(y_i(b + x_i^T w)), \text{ for } i = 1, \ldots, n,$$

$$f(b, w) = \frac{1}{n}\sum_{i=1}^{n} f_i(b, w),$$

and wherein $S_{\lambda_1}$ is a component-wise shrinkage operator, and $\hat{b}$ and $\hat{w}$ are a bias and a slope of the intermediate hyperplane definition $\hat{u}$; and re-updating $u^k$ with $\hat{u}^{k-1} = u^{k-1}$ only if $F(u^k) > F(u^{k-1})$, where F is defined as a function whereby $$\min_{b,w} F(b, w) \equiv f(b, w) + g(b, w)$$

where $$g(b, w) = \lambda_1 \|w\|_1 + \frac{\lambda_2}{2}|w|^2 + \frac{\lambda_3}{2}b^2.$$

In that method, each of the successive iterations k may further comprise storing $Vu^{k-1}$ and $Vu^k$ where $V = (v_1, \ldots, v_n)^T$ and $v_i = (y_i; y_i x_i)$; obtaining $V\hat{u}^k = Vu^k + \omega_k(Vu^k - Vu^{k-1})$; and computing $\nabla f(\hat{u}^{k-1})$ and evaluating $F(u^k)$ using $V\hat{u}^k$.

That method may further comprise, before solving for a separating hyperplane $u^*$, executing successive iterations k with $L_k = L_f$ until $w^k$ remains substantially unchanged, the iterations comprising: computing $\hat{u}^{k-1} = u^{k-1}$; updating the hyperplane $u^k$ as $$\begin{cases} b^k = \dfrac{L_k \hat{b}^{k-1} - \nabla_b f(\hat{u}^{k-1})}{L_k + \lambda_3} \\ w^k = \dfrac{1}{L_k + \lambda_2} S_{\lambda_1}(L_k \hat{w}^{k-1} - \nabla_w f(\hat{u}^{k-1})) \end{cases};$$

and re-updating $u^k$ with $\hat{u}^{k-1} = u^{k-1}$ only if $F(u^k) > F(u^{k-1})$; defining a lower-dimensional w by confining w to those elements for which support is substantially greater than 0; and performing the step of solving for a separating hyperplane $u^*$ with the lower-dimensional w.

The methods may be expanded as disclosed below to train a support vector machine classifier having more than two classes. The respective features of the exemplary embodiments of the invention may be applied jointly or severally in any combination or sub-combination by those skilled in the art.

BRIEF DESCRIPTION OF THE DRAWINGS

The teachings of the exemplary embodiments of the invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
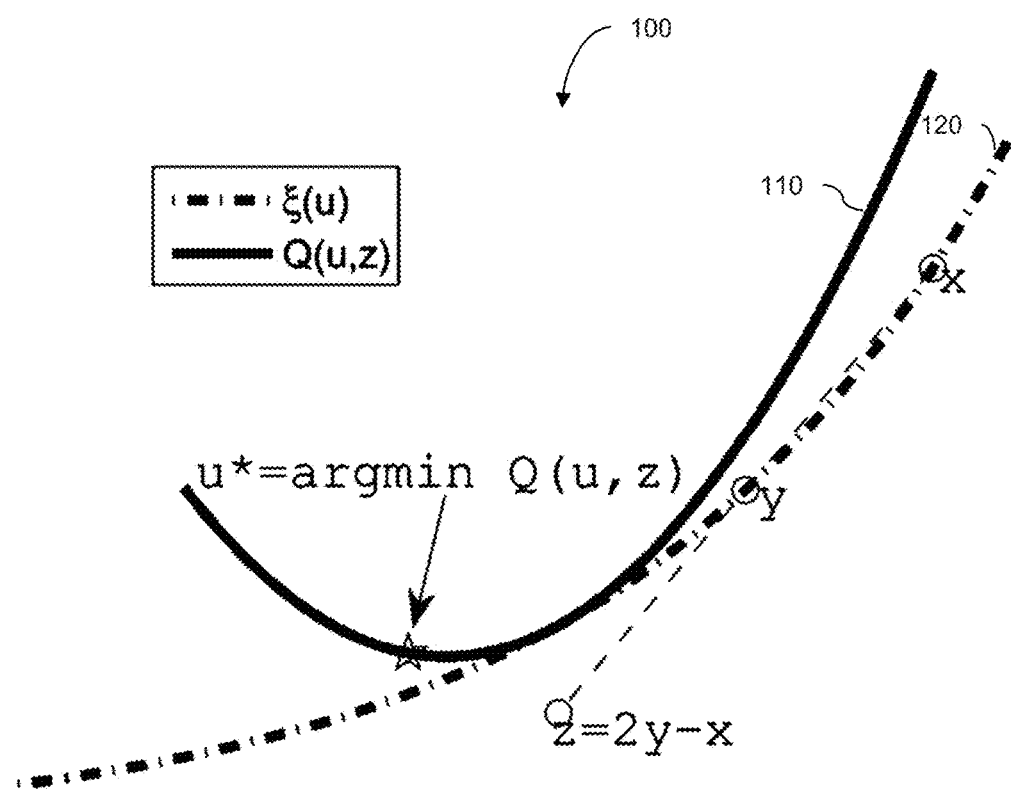
FIG. 1 shows a graphical depiction of a proximal gradient method for a binary class huberized support vector machine.

After considering the following description, those skilled in the art will realize that the exemplary embodiments of the invention can be utilized in training and using an algorithm for classifying data points.

The original SVM uses the hinge loss in the classification process. A major drawback of the hinge loss is that it is described by a non-differentiable function and as such it limits the application of the efficient optimization algorithms in the solution process of SVMs. For large-scale classification problems, the optimization problems that need to be solved are huge and they may require a lot of time to be solved accurately. Hence the use of fast optimization algorithms is vital.

The Proximal Gradient (PG) method is one of the fastest optimization algorithms. Its application in the original SVM, however, is problematic because of the non-differentiability of the hinge loss. In order to apply the PG method efficiently, the presently described methods transform the original SVM model by replacing the hinge loss with a differentiable approximation based on the Huber loss function. The PG method is then applied on the approximate optimization problem to solve it quickly and accurately. The disclosed methods are general enough to be applied to both Binary and Multi-class classification problems using SVM. By using only first order information (gradients) the technique is able to solve very large classification problems which may involve hundreds of thousands of features. From computational experiments, the inventors have determined that the disclosed algorithms are much faster and more accurate than state-of-the-art methods.

In the present disclosure, both B-SVM and M-SVM are considered. More precisely, both the binary-class huberized SVM (B-HSVM) (see expression (2) below) for B-SVM, and the "all-together" multi-class HSVM (M-HSVM) (see expression (3) below) for M-SVM, are considered. The advantage of HSVM over classic SVM with hinge loss is the continuous differentiability of its loss function, which enables the use of the "fastest" first-order method: Proximal Gradient (PG) method. The present disclosure demonstrates that the PG method is, in general, much faster than existing methods for (regularized) B-SVM and M-SVM, while yielding comparable prediction accuracies. In addition, extensive numerical experiments are presented to compare the presently disclosed method to state-of-the-art methods for both B-SVM and M-SVM on synthetic and also benchmark datasets. Statistical comparison is also performed to show the difference between the proposed method and other methods.

B-HSVM appears to be first considered in L. Wang, J. Zhu, and H. Zou, Hybrid huberized support vector machines for microarray classification and gene selection, Bioinformatics, 24(3):412-419 (2008) ("Wang et al."), the content of which is incorporated herein in its entirety. That paper demonstrates that B-HSVM can perform better than the original unregularized SVM and also $l_1$-regularized SVM (i.e., expression (1) below with $\lambda_2=0$) for microarray classification.

A closely related model to that of B-HSVM is the elastic net regularized SVM:

$$\min_{b,w} \frac{1}{n} \sum_{i=1}^{n} [1 - y_i(b + x_i^T w)]_+ + \lambda_1 \|w\|_1 + \frac{\lambda_2}{2} \|w\|_2^2 \quad (1)$$

where $[1-t]_+=\max(0,1-t)$ is the hinge loss function. The $l_1$-norm regularizer has the ability to perform continuous shrinkage and automatic variable selection at the same time, and the $l_2$-norm regularizer can help to reduce the variance of the estimated coefficients and usually results in satisfactory prediction accuracy, especially in the case where there are many correlated variables. The elastic net inherits the benefits of both $l_1$- and $l_2$-norm regularizers and can perform better than either of them alone.

Note that expression (1) uses non-differentiable hinge loss function while B-HSVM uses differentiable huberized hinge loss function. The differentiability makes B-HSVM relatively easier to solve. A path-following algorithm was proposed by Wang et. al for solving B-HSVM. Their algorithm is not efficient in particular for large-scale problems, since it needs to track the disappearance of variables along a regularization path. In Y. Yang and H. Zou, An efficient algorithm for computing the hhsvm and its generalizations, Journal of Computational and Graphical Statistics, (accepted for publication), the content of which is incorporated herein in its entirety, a Generalized Coordinate Descent (GCD) method is proposed, which was, in most cases, about 30 times faster than the path-following algorithm. However, the GCD method needs to compute the gradient of the loss function of B-HSVM after each coordinate update, which makes the algorithm slow.

M-HSVM has been considered in J. Li and Y. Jia, Huberized multiclass support vector machine for microarray classification, Acta Automatica Sinica, 36(3) 399-405 (2010), the content of which is incorporated herein in its entirety, which generalizes work by Wang et al. on B-SVM to M-SVM and also makes a path-following algorithm. Their algorithm, however, could be even worse since it also needs to track the disappearance of variables along a regularization path and M-HSVM often involves more variables than those of B-HSVM. Hence, it is not suitable for large scale problems, either.

The present disclosure develops an efficient PG method to solve the B-HSVM:

$$\min_{b,w} \frac{1}{n} \sum_{i=1}^{n} \phi_H(y_i(b + x_i^T w)) + \lambda_1 \|w\|_1 + \frac{\lambda_2}{2} \|w\|_2^2 + \frac{\lambda_3}{2} b^2, \quad (2)$$

and the "all-together" M-HSVM:

$$\min_{b,w} \frac{1}{n} \sum_{i=1}^{n} \sum_{j=1}^{J} a_{ij} \phi_H(b_j + x_i^T w_j) + \lambda_1 \|W\|_1 + \frac{\lambda_2}{2} \|W\|_2^2 + \frac{\lambda_3}{2} \|b\|^2, \quad (3)$$

s.t. $We = 0$, $e^T b = 0$,

In expression (2), $y_i \in \{+1, -1\}$ is the label of $x_i$, and $$\phi_H(t) = \begin{cases} 0, & \text{for } t > 1, \\ \frac{(1-t)^2}{2\delta}, & \text{for } 1 - \delta < t \leq 1, \\ 1 - t - \frac{\delta}{2}, & \text{for } t \leq 1 - \delta, \end{cases}$$

is the huberized hinge loss function. In expression (3), $y_i \in \{1, \ldots, J\}$ is the i-th label, $\|W\|_1 = \Sigma_{i,j} |w_{i,j}|$, $a_{ij}=1$ if $y_i \neq j$ and $a_{ij}=0$ otherwise, e denotes the vector with all one's, and $w_j$ denotes the j-th column of W. The constraints We=0 and $e^T b=0$ in expression (3) are imposed to eliminate redundancy in W, b and also are necessary to make the loss function $$l_M = \frac{1}{n} \sum_{i=1}^{n} \sum_{j=1}^{J} a_{ij} \phi_H(b_j + x_i^T w_j)$$

Fisher-consistent.

The PG methodology is chosen because it requires only first-order information and converges fast. As shown, for example, in Y. Nesterov, Introductory lectures on convex optimization, 87 (2004), it is an optimal first-order method. Note that the objectives in several other related known classifiers have non-smooth terms and are not differentiable. Hence, direct gradient or second order methods such as the interior point method are not applicable.

The presently disclosed algorithm is sped up by using a two-stage method, which detects the support of the solution at the first stage and solves a lower-dimensional problem at the second stage. For large-scale problems with sparse features, the two-stage method can achieve more than 5-fold acceleration. The convergence of the PG method is also analyzed under fairly general settings.

In addition, the proposed method is compared to state-of-the-art methods for B-SVM and M-SVM on both synthetic and benchmark datasets. Extensive numerical experiments demonstrate that the proposed method can outperform over other compared methods in most cases. Statistical tests are also performed to show significant differences between the compared methods.

Algorithms and Convergence Analysis:

In the following, an overview of the PG method is presented, and PG is then applied to the models represented by expression (2) (B-HSVM) and expression (3) (M-HSVM). Under strong convexity assumptions, the PG method possesses linear convergence.

In an overview of the PG method, composite optimization problems are considered in the form of:

$$\min_{u \in \mathcal{U}} \xi(u) \equiv \xi_1(u) + \xi_2(u), \quad (4)$$

where $\mathcal{U} \subset \mathbb{R}^m$ is a convex set, $\xi_1$ is a differentiable convex function with Lipschitz continuous gradient (that is, there exists L>0 such that $\|\nabla \xi_1(\bar{u}) - \nabla \xi_1(\tilde{u})\| \leq L \|\bar{u} - \tilde{u}\|$, for all $\bar{u} \in \mathcal{U}$, and $\xi_2$ is a proper closed convex function. The PG method for solving (4) iteratively updates the solution by $$u^k = \underset{u \in \mathcal{U}}{\operatorname{argmin}} Q(u, \hat{u}^{k-1}), \quad (5)$$

where $$Q(u, \hat{u}^{k-1}) =$$
$$\xi_1(\hat{u}^{k-1}) + \langle \nabla \xi_1(\hat{u}^{k-1}), u - \hat{u}^{k-1} \rangle + \frac{L_k}{2}\|u - \hat{u}^{k-1}\|^2 + \xi_2(u),$$
$$L_k > 0 \text{ and } \hat{u}^{k-1} = u^{k-1} + \omega_{k-1}(u^{k-1} - u^{k-2})$$

for some nonnegative $\omega_{k-1} \le 1$. The extrapolation technique can significantly accelerate the algorithm.

When $L_k$ is the Lipschitz constant of $\nabla \xi_1$, it can easily be shown that $\xi(u) \le Q(u, \hat{u}^{k-1})$, and thus this method is a kind of majorization minimization, as shown by the graph 100 of FIG. 1, which illustrates the PG method for a binary class HSVM. The solid curve 110 represents $Q(u, z)$, a majorization approximation of $\xi$ (represented by the dashed curve 120) at z, which is an extrapolated point of x and Y. The new iterate u* is the minimizer of Q.

With appropriate choice of $\omega_{k-1}$ and $L_k$, the sequence $\{\xi(u^k)\}$ converges to the optimal value $\xi^* = \xi(u^*)$. It has been shown that if $\omega_{k-1} \equiv 0$ and $L_k$ is taken as the Lipschitz constant of $\nabla \xi_1$, the $\{\xi(u^k)\}$ converges to $\xi^*$ with the rate $O(1/k)$ namely, $\xi(u^k) - \xi(u^*) \le O(1/k)$. In addition, using carefully designed $\omega_{k-1}$, it has been shown that the convergence rate can be increased to $O(1/k^2)$, which is the optimal rate of first-order methods for general convex problems.

To apply the PG method for binary-class HSVM, expression (2) is first written in the form of expression (4). Let $$\begin{cases} f_i(b, w) = \phi_H(y_i(b + x_i^T w)), \text{ for } i = 1, \ldots, n, \\ f(b, w) = \frac{1}{n}\sum_{i=1}^{n} f_i(b, w) \\ g(b, w) = \lambda_1\|w\|_1 + \frac{\lambda_2}{2}\|w\|^2 + \frac{\lambda_3}{2}b^2. \end{cases}$$

Then expression (2) can be written as $$\min_{b,w} F(b,w) \equiv f(b,w) + g(b,w) \quad (6)$$

Also, for convenience, the following notation will be used in the rest of this section:

$$u = (b;w), \quad v_i = (y_i; y_i x_i). \quad (7)$$

The function $f$ defined above is differentiable and convex, and its gradient $\nabla f$ is Lipschitz continuous with constant $$L_f = \frac{1}{n\delta}\sum_{i=1}^{n} y_i^2(1+\|x_i\|^2). \quad (8)$$

The proof of this proposition involves standard arguments.

PG may now be applied to expression (2). A proximal operator for a given extended real-valued convex function $h(u)$ on $\mathbb{R}^m$ is defined by:

$$\operatorname{prox}_h(v) = \operatorname{argmin} \frac{1}{2}\|u - v\|^2 + h(u).$$

By replacing $\xi_1$ and $\xi_2$ in (5) with $f$ and $g$, respectively, the following update is obtained:

$$\begin{cases} b^k = \dfrac{L_k \hat{b}^{k-1} - \nabla_b f(\hat{u}^{k-1})}{L_k + \lambda_3} \\ w^k = \dfrac{1}{L_k + \lambda_2} \mathcal{S}_{\lambda_1}\!\left(L_k \hat{w}^{k-1} - \nabla_w f(\hat{u}^{k-1})\right) \end{cases}, \quad (9)$$

where $\mathcal{S}_\nu(\cdot)$ is a component-wise shrinkage operator defined by $$\mathcal{S}_\nu(t) = \operatorname{sign}(t)\max(|t|-\nu, 0).$$

$L_k$ in expression (9) is dynamically updated by $$L_k = \min(\eta^{n_k} L_{k-1}, L_f), \quad (10)$$

where $\eta > 1$ is a pre-selected constant, $L_f$ is defined in expression (8) and $n_k$ is the smallest integer such that the following condition is satisfied:

$$f(\operatorname{prox}_{h_k}(v^{k-1})) \le f(\hat{u}^{k-1}) + \quad (11)$$
$$\langle \nabla f(\hat{u}^{k-1}), \operatorname{prox}_{h_k}(v^{k-1}) - \hat{u}^{k-1}\rangle + \frac{L_k}{2}\|\operatorname{prox}_{h_k}(v^{k-1}) - \hat{u}^{k-1}\|^2,$$

where $$h_k(u) = \frac{1}{L_k}g(u), \quad v^{k-1} = \hat{u}^{k-1} - \frac{1}{L_k}\nabla f(\hat{u}^{k-1})$$

and $$\hat{u}^{k-1} = u^{k-1} + \omega_{k-1}(u^{k-1} - u^{k-2})$$

for some weight $\omega_{k-1} \le 1$. The inequality in (11) is necessary to make the algorithm convergent. It guarantees sufficient decrease, and the setting $L_k = L_f$ will make it satisfied. In the case where $L_f$ becomes unnecessarily large, a smaller $L_k$ can speed up the convergence. To make the overall objective non-increasing, $u^k$ is re-updated by setting $\hat{u}^{k-1} = u^{k-1}$ in expression (9) whenever $F(u^k) > F(u^{k-1})$. This non-increasing monotonicity is very important, since it is observed that the PG method may be numerically unstable without this modification. In addition, it significantly accelerates the PG method.

Figure 2:
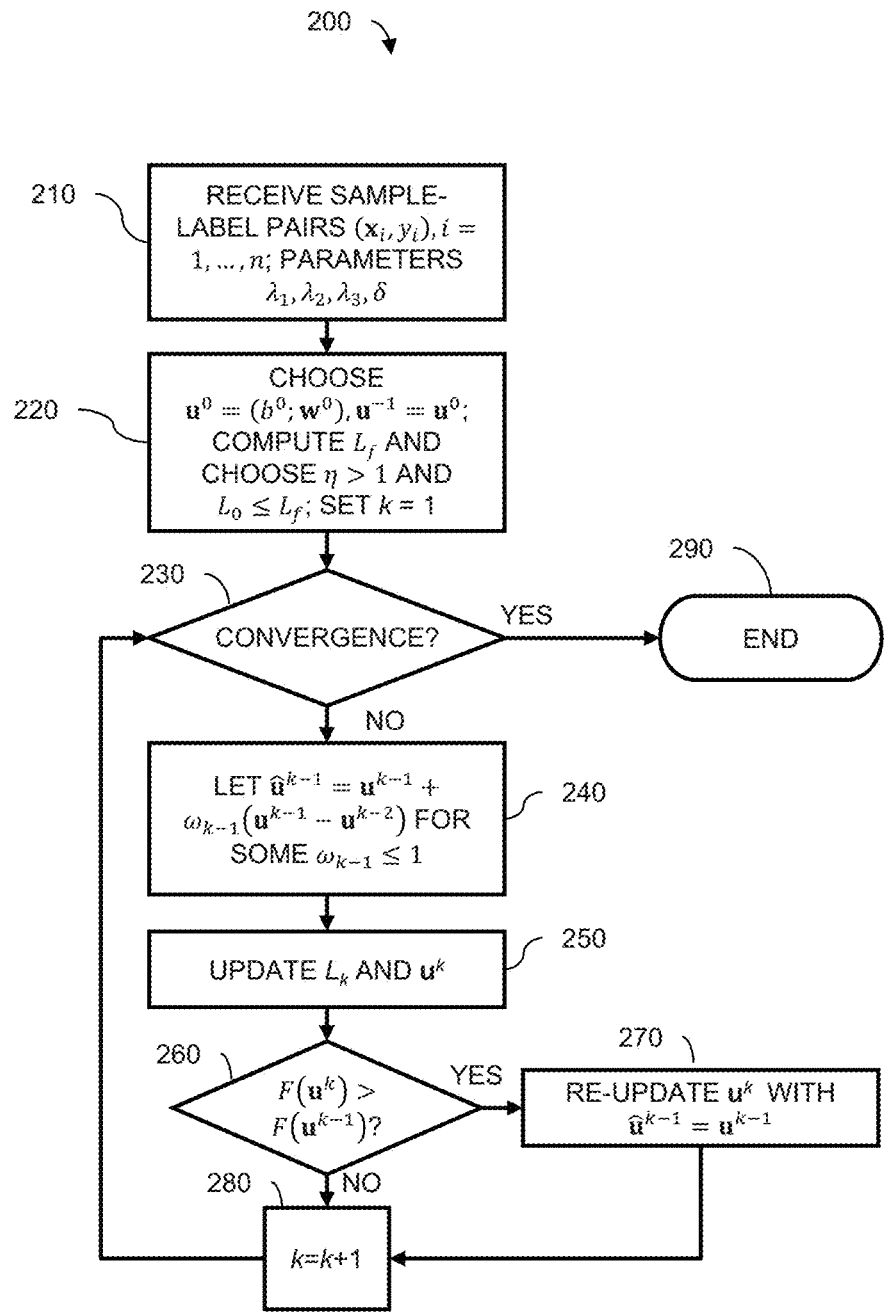
FIG. 2 is a flow chart illustrating an algorithm for solving a binary class huberized support vector machine using a proximal gradient method.

The following method will be referred to hereinafter as the B-PGH algorithm. The algorithm is illustrated by block diagram 200 of FIG. 2, and the numbers refer to blocks in the figure.

```
210:   Input: sample-label pairs (x_i, y_i), i = 1, ..., n;
       parameters λ_1, λ_2, λ_3, δ.
220:   Initialization: choose u^0 = (b^0; w^0), u^-1 = u^0;
       compute L_f from (8) and choose η > 1. and L_0 ≤ L_f; set k = 1.
230:   while Not converged do
240:       Let û^{k-1} = u^{k-1} + ω_{k-1}(u^{k-1} - u^{k-2}) for some ω_{k-1} ≤ 1;
250:       Update L_k according to (10) and u^k according to (9);
260:       if F (u^k) > F (u^{k-1}) then
270:           Re-update u^k according to (9) with û^{k-1} = u^{k-1};
           end if
280:       Let k = k + 1.
       end while
290    end
```

The basic idea of the algorithm 200 is to generate a sequence of points that converges fast enough to the optimal solution of the optimization problem (2). The algorithm starts from a point $u^0$ that is defined by the user or chosen randomly by the software. The iterations then generate $u^1$, $u^2$, $u^3$, ... that are always closer to the optimal solution $u^*$.

In the k-th iteration, the algorithm uses two previous points, $u^{k-1}$ and $u^{k-2}$, and defines an intermediate point $\hat{u}^{k-1}$, which may be closer to the optimal point $u^*$ than the original point $u^{k-1}$. By using the intermediate point $\hat{u}^{k-1}$, the algorithm makes larger steps and it is able to arrive to the optimal point $u^*$ in fewer steps, and hence the algorithm becomes faster than using simply the original point $u^k$.

In addition, the algorithm 200 selects a proper value of the Lipschitz parameter, defined as $L_k$, which is responsible for making the loss function, described in equation (2), continuous, The proper value of $L_k$ is defined by using equation (10).

Next the algorithm determines the new step, $u^k$, which is closer to the optimal point $u^*$ than any other point determined so far (including $\hat{u}^{k-1}$). The new step $u^k$ is determined by using equation (11).

The algorithm iterates between the above three major steps (definition of $\hat{u}^{k-1}$, $L_k$, and $u^k$) until it reaches the optimal point $u^*$.

In the following, the PG method is generalized for solving for multi-class HSVM classification problems. Denote $U=(b:W)$. Let $$G(b, W) = \lambda_1 \|W\|_1 + \frac{\lambda_2}{2}\|W\|_F^2 + \frac{\lambda_3}{2}\|b\|^2,$$
$$\mathcal{U} = \{(b, W) : We = 0, e^T b = 0\}.$$

Then expression (3) can be written as $$\min_{U \in \mathcal{U}} H(U) \equiv l_M(U) + G(U). \tag{12}$$

As with the binary classifier discussion, it can be shown that $\nabla_u l_M$ is Lipschitz continuous with constant $$L_m = \frac{J}{n\delta} \sum_{i=1}^{n} (1 + \|x_i\|^2). \tag{13}$$

As with the binary classifier discussion, the proof involves standard arguments.

It is now possible to apply the PG method to expression (3) or equivalently to expression (12). U is updated iteratively by solving the b-subproblem $$b^k = \operatorname*{argmin}_{e^T b = 0} \left\langle \nabla_b l_M(\hat{U}^{k-1}), b - \hat{b}^{k-1} \right\rangle + \frac{L_k}{2}\left\|b - \hat{b}^{k-1}\right\|^2 + \frac{\lambda_3}{2}\|b\|^2, \tag{14}$$

and the W-subproblem $$W^k = \operatorname*{argmin}_{We=0} \left\langle \nabla_W \ell_M(\hat{U}^{k-1}), W - \hat{W}^{k-1} \right\rangle + \frac{L_k}{2}\left\|W - \hat{W}^{k-1}\right\|^2 + \lambda_1\|W\|_1 + \frac{\lambda_2}{2}\|W\|^2, \tag{15}$$

where $L_k$ is chosen is chosen in the same way as in expression (11).

The b-subproblem (14) is relatively easy and has a closed form solution, Let $$P = \begin{bmatrix} I \\ -e^T \end{bmatrix} \in \mathbb{R}^{J \times (J-1)} \text{ and } \bar{b} \in \mathbb{R}^{J-1}$$

be the vector comprising the first J−1 components of b, where I denotes the identity matrix. Substituting $b = P\bar{b}$ to expression (14) gives the solution $$\bar{b}^k = \frac{1}{\lambda_3 + L_k} (P^T P)^{-1} P^T \left( L_k \hat{b}^{k-1} - \nabla_b \ell_M(\hat{U}^{k-1}) \right).$$

Hence, the update in expression (14) can be explicitly written as $$b^k = P\bar{b}^k, \tag{16}$$

where $\bar{b}^k$ is defined in the above equation.

The W-subproblem (15) can be further decomposed into p independent small problems. Each of them involves only one row of W and can be written in the following form:

$$\min_w \frac{1}{2}\|w - z\|^2 + \lambda\|w\|_1, \text{ s.t. } e^T w = 0, \tag{17}$$

where $$\lambda = \frac{\lambda_1}{L_k + \lambda_2} \text{ and } z^T$$

is the i-th row-vector of the matrix $$\frac{L_k}{L_k + \lambda_2} \hat{W}^{k-1} - \frac{1}{L_k + \lambda_2} \nabla_W \ell_M(\hat{U}^{k-1})$$

for the i-th small problem. The coexistence of the non-smooth term $\|w\|_1$ and the equality constraints $e^T w = 0$ makes expression (17) a difficult optimization problem to solve. Next is described an efficient yet simple method for solving expression (17) using its dual problem, defined by $$\max_\sigma \gamma(\sigma) \equiv \frac{1}{2}\|S_\lambda(z - \sigma) - z\|^2 + \lambda\|S_\lambda(z - \sigma)\|_1 + \sigma e^T S_\lambda(z - \sigma). \tag{18}$$

Figure 3:
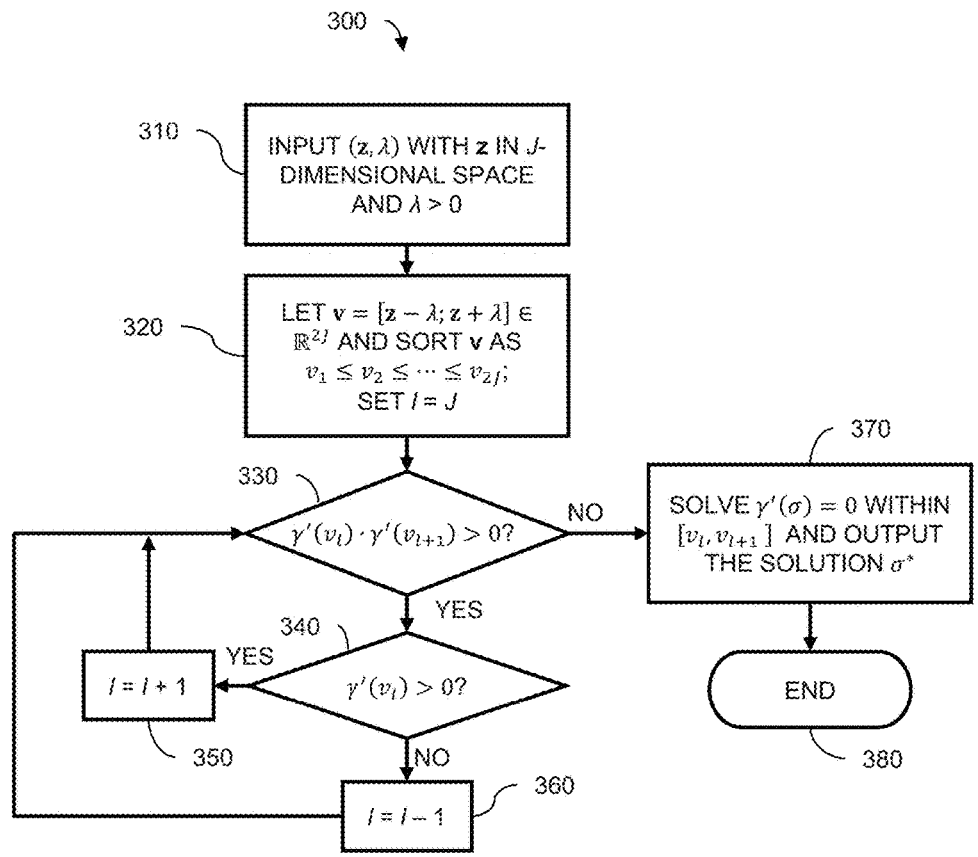
FIG. 3 is a flow chart illustrating an algorithm for solving a single row of a subproblem of a multi-class huberized support vector machine using a proximal gradient method.

Since (17) is strongly convex, $\gamma(\sigma)$ is concave and continuously differentiable. Hence, the solution $\sigma^*$ of (18) can be found by solving the single-variable equation $\gamma'(\sigma)=0$. It is easy to verify that $\gamma'(z_{min}-\lambda)>0$ and $\gamma'(z_{max}+\lambda)<0$, so the solution $\sigma^*$ lies between $z_{min}-\lambda$ and $z_{max}+\lambda$, where $z_{min}$ and $z_{max}$ respectively denote the minimum and maximum components of z. In addition, note that $s_\lambda(z-\sigma)$ is piece-wise linear about $\sigma$, and the breakpoints are at $z_i \pm \lambda$, i=1, ..., J. Hence $\sigma^*$ must be in $[v_l, v_{l+1}]$ for some l, where v is the sorted vector of (z−λ;z+λ) in the increasing order. Therefore, to solve expression (18), v is first obtained, then the interval that contains σ* is searched by checking the sign of γ'(σ) at the breakpoints, and finally γ'(σ)=0 is solved within that interval. The following algorithm, depicted by the flowchart 300 of FIG. 3, summarizes the exact method for solving expression (18). The numbers refer to elements in the figure.

```
310:    Input: (z,λ) with z in J-dimensional space and λ > 0.
320:    Let v = [z − λ; z + λ] ∈ R^{2J} and sort v as
        v_1 ≤ v_2 ≤ ... ≤ v_{2J}; set l = J.
330:    while γ'(v_l) · γ'(v_{l+1}) > 0 do
340-360: If γ'(v_l) > 0, set l = l + 1; else, l = l − 1
        end while
370:    Solve γ'(σ) = 0 within [v_l, v_{l+1}] and output the solution σ*.
380:    end
```

Figure 4:
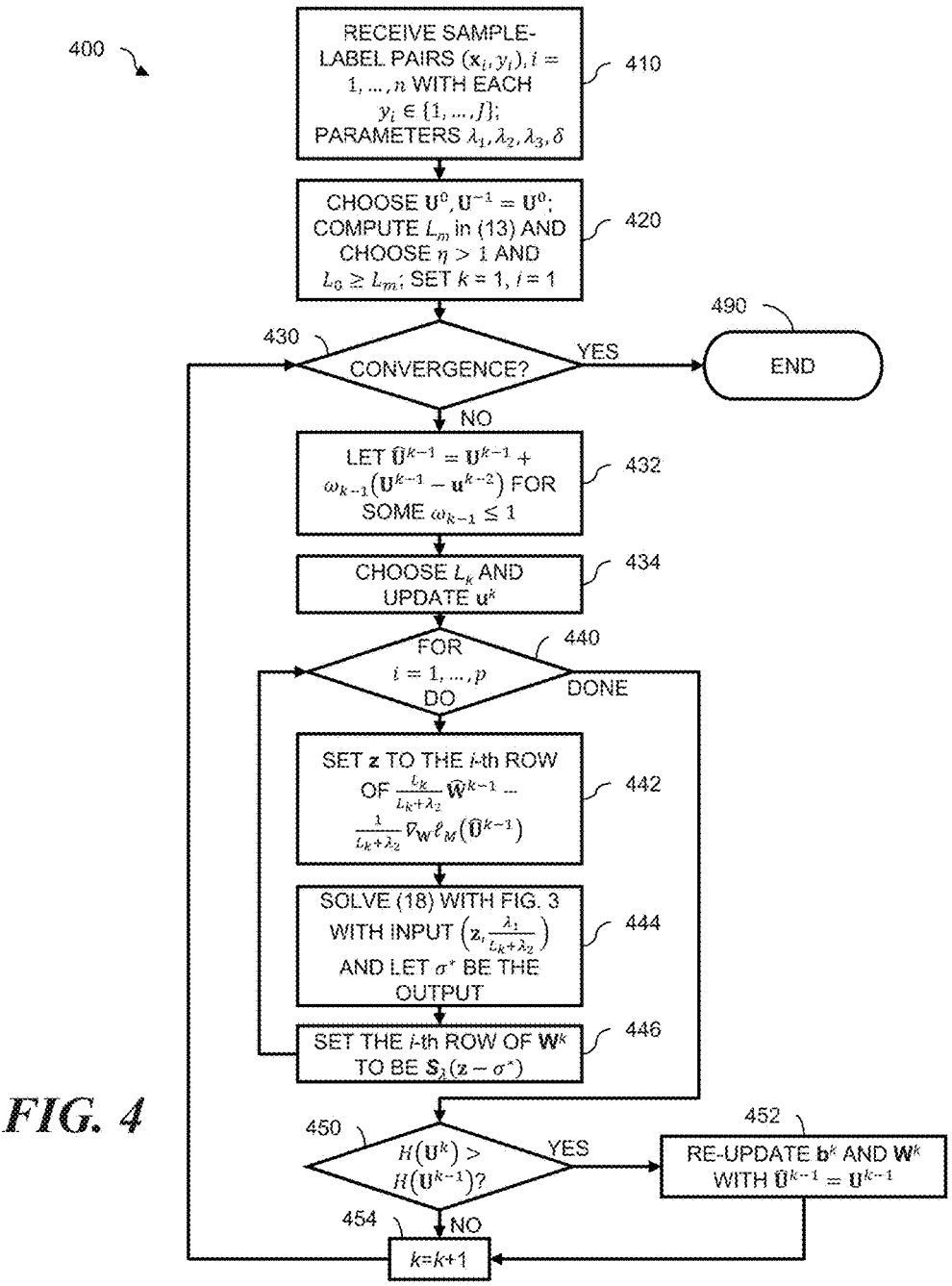
FIG. 4 is a flow chart illustrating an algorithm for solving a multi-class huberized support vector machine using a proximal gradient method.

After determining σ*, the solution of (17) can be obtained by setting $w^* = s_\lambda(z - \sigma^*)$. The following algorithm summarizes the main steps of the PG method for efficiently solving the multi-class SVM (M-HSVM) problem (3). The algorithm, depicted by the flowchart 400 of FIG. 4, will be referred to hereinafter as the M-PGH-algorithm. Again, numbers refer to elements in the figure.

```
410:    Input: sample-label pairs (x_i, y_i), i = 1, ..., n with each y_i ∈ {1, ..., J}; param-
        eters
        λ_1, λ_2, λ_3, δ.
420:    Initialization: choose U^0, U^{−1} = U^0; compute L_m in (13) and choose η > 1 and
        L_0 ≥ L_m; set k = 1.
430:    while Not converged do
432:        Let Û^{k−1} = U^{k−1} + ω_{k−1}(U^{k−1} − u^{k−2}) for some ω_{k−1} ≤ 1;
434:        Choose L_k in the same way as in expression (10); and
            Update b^k according to expression (16);
440:        for i = 1, ..., p do
442:            Set z to the i-th row of $\frac{L_k}{L_k + \lambda_2} \hat{W}^{k-1} - \frac{1}{L_k + \lambda_2} \nabla_W \ell_M(\hat{U}^{k-1})$;

444:            Solve (18) using the above algorithm with input $\left(z, \frac{\lambda_1}{L_k + \lambda_2}\right)$ and
                let σ* be the output;
446:            Set the i-th row of W^k to be S_λ(z − σ*);
            end for
450:        if H(U^k) > H(U^{k−1}) then
452:            Re-update b^k and W^k according to (16) and (15) with
                Û^{k−1} = U^{k−1};
            end if
454:        Let k = k + 1.
        end while
490:    end
```

Instead of analyzing the convergence of algorithms for solving the B-HSVM and M-HSVM problems presented above, the present disclosure analyzes the PG method for expression (4) with general $\xi_1$ and $\xi_2$ and regards the algorithms as special cases. Throughout the analysis, it is assumed that $\xi_1$ is a differentiable convex function and $\nabla \xi_1$ is Lipschitz continuous with Lipschitz constant L. It is also assumed that $\xi_2$ is strongly convex with constant μ>0, namely, $$\xi_2(u) - \xi_2(v) \geq \langle g_v, u - v \rangle + \frac{\mu}{2}\|u - v\|^2,$$

for any $g_v \in \partial \xi_2(v)$ and u, v∈dom($\xi_2$), where dom($\xi_2$)={u∈ $\mathbb{R}^m$:$\xi_2$(u)<∞} denotes the domain of $\xi_2$.

While similar results have been shown in the literature, the present analysis fits to more general settings. Specifically, dynamic update of the Lipschitz parameter $L_k$ and an acceptable interval of the parameters $\omega_k$ are allowed. On the other hand, prior results either require $L_k$ to be fixed to the Lipschitz constant of $\xi_1$ or require specific values for the $\omega_k$'s. In addition, the prior techniques do not perform the re-update step as in operation 270 of the B-PGH algorithm or operation 490 of the M-PGH algorithm.

The PG method was tested under different settings on synthetic datasets, to demonstrate the practical effect that each setting has on the overall performance of the PG method. The numerical results are summarized in the Table 1 below, which shows that the PG method under the presently disclosed settings converges significantly faster than that under the settings used in two selected prior works. Specifically, the table compares the presently disclosed results to those of Y. Nesterov, Gradient methods for minimizing composite objective function, CORE Discussion Papers (2007) ("Nesterov et al.") and to those of M. Schmidt, N. L. Roux, and F. Bach, Convergence rates of inexact proximal-gradient methods for convex optimization, Arxiv preprint arXiv:1109.2415 (2011) ("Schmidt et al."). Nesterov et al. sets $L_k=L_f$ for all k; neither Nesterov nor Schmidt makes F($x_k$) non-increasing. The test data was generated synthetically according to a Gaussian distribution; the correlation parameter was set to ρ=0.

TABLE 1

| Problems | Present settings | | | Settings of Nesterov et al. | | | Settings of Schmidt et al. | | |
|---|---|---|---|---|---|---|---|---|---|
| (n; p; s) | #iter | time | obj. | #iter | time | obj. | #iter | time | obj. |
| (3000, 300, 30) | 34 | 0.06 | 1.0178e−1 | 135 | 0.22 | 1.0178e−1 | 475 | 0.75 | 1.0178e−1 |
| (2000, 20000, 200) | 91 | 4.34 | 8.0511e−2 | 461 | 21.77 | 8.0511e−2 | 2000 | 99.05 | 8.0511e−2 |

To analyze PG method under fairly general settings, the so-called Kurdyka-Lojasiewicz (KL) inequality was used, which has been widely applied in non-convex optimization. The results show that the KL inequality can also be applied and simplify the analysis in convex optimization.

To analyze convergence, let $\{u^k\}$ be the sequence generated by equation (5) $L_k \leq L$ and $\hat{u}^{k-1} = u^{k-1} + \omega_{k-1}(u^{k-1} - u^{k-2})$ for some $$\omega_{k-1} \leq \sqrt{\frac{L_{k-1}}{L_k}}.$$

In addition. $\{\xi(u^k)\}$ is made nonincreasing by re-updating $u^k$ with $\hat{u}^{k-1} = u^{k-1}$ in expression (5) whenever $\xi(u^k) > \xi(u^{k-1})$. Then $u^k$ R-linearly converges to the unique minimizer $u^*$ of expression (4), namely, there exist positive constants C and $\tau < 1$ such that $$\|u^k - u^*\| \leq C\tau^k, \forall k \geq 0. \quad (21)$$

U-sing the results of this theorem, the convergence results of the B-PGH algorithm and the M-PGH algorithm are established in the following corollary. Let $\{u^k\}$ and $\{U^k\}$ be the sequences generated by the two algorithms with $\lambda_2, \lambda_3 > 0$ and $$\omega_{k-1} \leq \sqrt{\frac{L_{k-1}}{L_k}}.$$

Then $\{u^k\}$ and $\{U^k\}$ R-linearly converge to the unique solutions of the B-PGH algorithm and the M-PGH-algorithm, respectively.

Note that if one of $\lambda_2$ and $\lambda_3$ vanishes, there is only sublinear convergence by some appropriate choice of $\omega_k$.

A two-stage accelerated method for large-scale problems will now be described. Most of the cost of the B-PGH algorithm at iteration k occurs in the computation of $\nabla f(\hat{u}^{k-1})$ and the evaluation of $F(u^k)$. Let $V = (v_1, \ldots, v_n)^T$ where $(v_1, \ldots, v_n)$ are defined in expression (7). To compute $\nabla f(\hat{u}^{k-1})$, the values $V\hat{u}^{k-1}$ and $\nabla f_i(\hat{u}^{k-1})$, i=1, . . . , n are needed, which costs O(np) in total. Evaluating $F(u^k)$ needs $Vu^k$, which costs O(np). To save the computing time, both $Vu^{k-}$ and $Vu^k$ are stored so that $V\hat{u}^k$ can be obtained by $V\hat{u}^k = Vu^k + \omega_k(Vu^k - Vu^{k-1})$. That way, $Vu^k$ need be computed only once during each iteration, and the total computational cost is O(Tnp) where T is the total number of iterations.

As p is large and the solution of equation (2) is sparse, namely, only a few features are relevant, the cost of the B-PGH algorithm can be further reduced by switching from the original high-dimensional problem to a lower-dimensional one. More precisely, the B-PGH algorithm is first run with $L_k = L_f$ and $\omega_k = 0$ until the support of $w^k$ remains almost unchanged. Then equation (2) is reduced to a lower-dimensional problem by confining w to the detected support, namely, all elements out of the detected support are kept zero. Finally, the B-PGH algorithm is employed again to solve the lower-dimensional problem. The two-stage method for (2) is named as B-PGH-2, and its solidness rests on the following:

Let $\{(b^k, w^k)\}$ be the sequence generated by the B-PGH algorithm with $L_k = L_f$ and $\omega_k = 0$ starting from any $u^0 = (b^0, w^0)$. Suppose $u^* = (b^*, w^*)$ is the unique solution of equation (2) with $\lambda_3 > 0$. Let $$Q(b, w) = f(b, w) + \frac{\lambda_2}{2}\|w\|^2 + \frac{\lambda_3}{2}b^2,$$

$$h_i(w) = w_i - \frac{1}{L_f + \lambda_2}\nabla_{w_i} Q(u),$$

and $$I = \{i : |\nabla_{w_i} Q(u^*)| < \lambda_1\}, \varepsilon = \{i : |\nabla_{w_i} Q(u^*)| < \lambda_1\},$$

where $w_i$ is the ith component of w. Then supp(w*) ⊂ ε and $w_i^* = 0, \forall i \in I$, where supp(w*) denotes the support of w*. In addition, $w_i^k = 0, \forall i \in I$ and sign $(h_i(w^k)) = $ sign $(h_i(w^*)), \forall i \in \varepsilon$ for all but at most finite iterations.

Suppose the cardinality of the solution support is s. Then the total computational cost of the two-stage method B-PGH-2 is $O(T_1np + T_2ns)$, where $T_1, T_2$ are the numbers of iterations in the first and second stages, respectively. Numerically, it was found that supp(w*) could be detected in several iterations, namely, $T_1$ is usually small. When s<<p, B-PGH-2 can be significantly faster than B-PGH, In the same way, the M-PGH algorithm can be accelerated by a two-stage method.

Numerical Experiments

In the first part of this section, B-PGH, described in Algorithm 200, is compared with two very recent binary-class SVM solvers using ADMM, described in G. B. Ye, Y. Chen, and X. Xie, Efficient variable selection in support vector machines via the alternating direction method of multipliers, In Proceedings of the International Conference on Artificial Intelligence and Statistics (2011), and GCD3, described in Yi Yang and Hui Zou, An efficient algorithm for computing the hhsvm and its generalizations, Journal of Computational and Graphical Statistics, 22(2):396-415 (2013), on both synthetic and real data. ADMM solves model (1) whereas both B-PGH and GCD solve (2). In the second part of this section, the performance of five different multi-class SVMs are compared: the model defined by (3), the $l_1$-regularized M-SVM described in L. Wang and X. Shen, On L-norm multiclass support vector machines, Journal of the American Statistical Association, 102(478):583-594 (2007), the $l_\infty$-regularized M-SVM described in H. Zhang, Y. Liu, Y. Wu, and J. Zhu, Variable selection for the multicategory svm via adaptive sup-norm regularization, Electronic Journal of Statistics, 2:149-167 (2008), the "one-vs-all" (OVA) method described in L. Bottou et al., Comparison of classifier methods: a case study in handwritten digit recognition, In Proceedings of the 12th IAPR International Conference on Pattern Recognition, vol. 2, pages 77-82 (IEEE 1994), and the Decision Directed Acyclic Graph (DDAG) method described in J. C. Platt, N. Cristianini, and J. Shawe-Taylor, Large margin dags for multiclass classification, Advances in neural information processing systems, 12(3):547-553 (2000). M-PGH, described in Algorithm 400 above, is used to solve expression (3), and Sedumi, found in J. F. Sturm, Using SeDuMi 1.02, a MATLAB toolbox for optimization over symmetric cones, Optimization methods and software, 11(1-4):625-653 (1999) is used for the $l_1$ and $l_\infty$-regularized M-SVMs. Sedumi is called through CVX. All the tests were performed on a computer having an i7-620m CPU and 3-GB RAM and running 32-bit Windows 7 and Matlab 2010b.

Binary-Class SVM:

For B-PGH, the parameters $\eta$ and $L_0$ were set to $\eta=1.5$ and $$L_0 = \frac{2L_f}{n},$$

respectively. We chose $$\omega_{k-1} = \min\left(\frac{t_{k-1}}{t_k}, \sqrt{\frac{L_{k-1}}{L_k}}\right),$$

where $t_0=1$ and $$t_k = \frac{1}{2}\left(1 + \sqrt{1 + 4t_{k-1}^2}\right).$$

The starting point was chosen to be a zero vector. BPGH is stopped if both of the following conditions are satisfied during three consecutive iterations:

$$\frac{F_{k-1}}{1+F_{k-1}} \le tol, \quad \frac{\|u^{k-1} - u^k\|}{1+\|u^{k-1}\|} \le tol,$$

where $u^k=(b^k,w^k)$ and $F_k=F(u^k)$. The stopping tolerance was set to tol=$10^{-6}$ for B-PGH and GCD and tol=$10^{-5}$ for ADMM since tol=$10^{-6}$ was too stringent. For B-PGH-2, tol=$10^{-3}$ was taken at the first stage and tol=$10^{-6}$ at the second stage. The penalty parameters for ADMM were set to $\mu_1=100/n$ and $\mu_1=50$ as suggested in G. B. Ye et al. All the other parameters for ADMM and GCD were set to their default values.

Synthetic data: n samples were generated in $\mathbb{R}^p$ with one half in the "+1" class and the other half in the "−1" class. Specifically, each sample in the "+1" class was generated according to the Gaussian distribution $\mathcal{N}(\mu,\Sigma)$ and each sample in the "−1" class according to $\mathcal{N}(-\mu,\Sigma)$. The mean vector $$\mu = \left(\underbrace{1, \ldots, 1}_{s}, \underbrace{0, \ldots, 0}_{p-s}\right)^T,$$

and the covariance matrix $$\Sigma = \begin{bmatrix} \rho 1_{s\times s} + (1-\rho)I_{s\times s} & 0_{s\times(p-s)} \\ 0_{(p-s)\times s} & I_{(p-s)\times(p-s)} \end{bmatrix}$$

where $1_{s\times s}$ is the matrix of size s×s with all one's, 0 is the matrix with all zero's, and $I_{s\times s}$ is an identity matrix of size s×s. The first s variables are relevant for classification and the rest are noise. The speed of the algorithms was tested on different sets of dimension (n, p, s) and the correlation $\rho$. The smoothing parameter for B-PGH and GCD was set to $\delta=1$ in this subsection, and $\lambda_3=\lambda_2$ is set in the next subsection. Table 2 lists the average running time (sec) of 10 independent trials. For each run, the time over 25 different pairs of $(\lambda_1,\lambda_2)$ was averaged. From the results, it can be seen that B-PGH was consistently faster than GCD and over 50 times faster than ADMM. In addition, B-PGH-2 was significantly faster than B-PGH when p was large and s<<p.

TABLE 2

| Problems | B-PGH | | B-PGH-2 | | GCD | | ADMM | |
|---|---|---|---|---|---|---|---|---|
| (n, p, s) | $\rho=0$ | $\rho=0.8$ | $\rho=0$ | $\rho=0.8$ | $\rho=0$ | $\rho=0.8$ | $\rho=0$ | $\rho=0.8$ |
| (500, 50, 5) | 0.0060 | 0.0081 | 0.0059 | 0.0071 | 0.0116 | 0.0192 | 0.6354 | 0.8641 |
| (2000, 100, 10) | 0.0176 | 0.0256 | 0.0173 | 0.0218 | 0.0848 | 0.1469 | 2.4268 | 3.5340 |
| (50, 300, 30) | 0.0126 | 0.0162 | 0.0099 | 0.0113 | 0.0338 | 0.0409 | 0.6819 | 1.1729 |
| (100, 500, 50) | 0.0179 | 0.0242 | 0.0117 | 0.0152 | 0.0727 | 0.0808 | 1.4879 | 2.5482 |
| (200, 2000, 100) | 0.0720 | 0.1227 | 0.0301 | 0.0446 | 0.5653 | 0.4735 | 7.9985 | 12.998 |
| (2000, 20000, 200) | 5.7341 | 8.5379 | 1.1543 | 1.7531 | 32.721 | 30.558 | — | — |

The prediction accuracy and variable selection of the algorithms was also tested. The problem dimension was set to n=50; p=300; s=20. The optimal pair of $(\lambda_1,\lambda_2)$ was selected from a large grid by 10-fold cross validation. We use $n_r$ for the number of selected relevant variables and $n_f$ for the number of selected noise variables. In addition, "accu" was used for the prediction accuracy. The average results of 500 independent runs corresponding to $\rho=0$ and $\rho=0.8$ are shown in Table 3. During each run, the algorithms were compared on a test set of 1000 samples. From the table, it can be seen that B-PGH achieved similar accuracy to that by GCD, and they both performed better than ADMM, especially in the case of $\rho=0.8$. In addition, B-PGH-2 obtained similar solutions as B-PGH.

TABLE 3

| Algorithms | ρ = 0 | | | ρ = 0.8 | | |
| --- | --- | --- | --- | --- | --- | --- |
| | $n_t$ | $N_f$ | accu. (%) | $n_t$ | $N_f$ | accu. (%) |
| B-PGH | 20.0 (0.1) | 0.1 (0.4) | 100 (0.000) | 19.9 (0.3) | 7.3 (3.9) | 86.6 (0.011) |
| B-PGH-2 | 20.0 (0.1) | 0.1 (0.3) | 100 (0.000) | 19.9 (0.4) | 7.5 (4.1) | 86.6 (0.011) |
| GCD | 20.0 (0.1) | 0.1 (0.3) | 100 (0.000) | 19.9 (0.4) | 7.4 (3.8) | 86.4 (0.011) |
| ADMM | 19.0 (0.9) | 2.9 (1.8) | 100 (0.000) | 17.2 (1.5) | 23.1 (6.0) | 85.7 (0.013) |

Medium-scale real data: In this subsection, B-PGH, GCD and ADMM are compared on medium-scale real data, as shown in Table 4. The first seven datasets are available from the LIBSVM dataset and the last three from Tom Mitchells neuroinformatics research group. Both rcv1 and realsim have large feature dimensions but only about 0.2% nonzeros. colon, duke and leuk are datasets of gene expression profiles for colon cancer, breast cancer and leukemia, respectively. The original dataset of colon consists of 62 samples, of which 30 are randomly chosen for training and the rest for testing. gisette is a hand-writing digit recognition problem from NIPS 2003 Feature Selection Challenge. The training set for gisette is a random subset of the original 6000 samples, and the testing set contains all of the original $\lambda_2=\lambda_3=0$ were fixed since the algorithms appeared not sensitive to $\lambda_2$ and $\lambda_3$. The optimal $\lambda_1$'s were tuned by 10-fold cross-validation on training sets. The smoothing parameter was set to $\delta=1$ for both B-PGH and GCD. All the other settings are the same as those in the previous test. The results are shown in Table 5. The best prediction accuracy for each data set is highlighted in bold. For comparison, the prediction accuracies by LIBLINEAR with L-regularized L2-loss are also reported. From the results, it can be seen that B-PGH is significantly faster than GCD and ADMM, and it also gives the best prediction accuracy. B-PGH-2 was fastest and achieved the same accuracy as B-PGH except for gisette. Note that GCD can give the same accuracy as B-PGH but it needs to run much longer time.

TABLE 5

| Dataset | B-PGH | | | B-PGH-2 | | | GCD | | | ADMM | | | LIBLINEAR |
| --- | --- | --- | --- | --- | --- | --- | --- | --- | --- | --- | --- | --- | --- |
| | accu (%) | supp | time | accu (%) | supp | time | accu (%) | supp | time | accu (%) | supp | time | accu (%) |
| australian | 87.4 | 11 | 0.01 | 87.4 | 11 | 0.01 | 86.7 | 10 | 0.02 | 86.9 | 14 | 1.08 | 85.7 |
| colon | 84.4 | 89 | 0.04 | 84.4 | 89 | 0.05 | 84.4 | 89 | 0.38 | 84.4 | 118 | 1.48 | 81.3 |
| duke | 90 | 118 | 0.20 | 90 | 118 | 0.10 | 90 | 112 | 0.93 | 90 | 171 | 3.11 | 80 |
| gisette | 92.9 | 977 | 1.99 | 92.7 | 946 | 1.94 | 92.6 | 959 | 17.61 | 92.8 | 1464 | 218.5 | 91.7 |
| leuk | 91.2 | 847 | 0.19 | 91.2 | 846 | 0.15 | 82.4 | 716 | 3.10 | 82.4 | 998 | 2.35 | 91.2 |
| sub-rcv1 | 84.8 | 1035 | 0.06 | 84.8 | 1035 | 0.05 | 83.3 | 1035 | 3.46 | 82.3 | 1776 | 2.61 | 80.1 |
| sub-realsim | 92.9 | 1134 | 0.04 | 92.9 | 1134 | 0.02 | 91.9 | 1134 | 2.96 | 92.8 | 1727 | 1.61 | 90.9 |
| fMRIa | 90 | 141 | 0.07 | 90 | 141 | 0.06 | 70 | 130 | 5.31 | 70 | 203 | 0.57 | 70 |
| fMRIb | 100 | 1098 | 0.11 | 100 | 1108 | 0.07 | 90 | 180 | 2.26 | 100 | 1767 | 0.03 | 70 |
| fMRIc | 100 | 1827 | 0.10 | 100 | 1825 | 0.08 | 80 | 1324 | 2.05 | 90 | 1882 | 0.06 | 50 |

1000 samples. rcv1 is a collection of manually categorized news wires from Reuters. Both the training and tesing instances for sub-rcv1 are randomly sub-sampled from the original training and testing samples. realsim contains UseNet articles from four discussion groups, for simulated auto racing, simulated aviation, real autos and real aviation. The original dataset of realsim has 72,309 samples, and 500 instances were randomly sub-sampled for training and 1,000 instances for tesing. fMRIa, fMRIb, and fM-RIc are functional MRI (fMRI) data of brain activities when the subjects are presented with pictures and text paragraphs.

Statistical comparison: A statistical comparison of B-PGH, GCD, and ADMM was also performed. The Wilcoxon signed-ranks test and Friedman test were done to see if the differences of the compared methods are significant. The former test is for pair-wise comparison and the latter one for multiple comparison. Specifically, for two different methods, denote $d_i$ as the difference of their score (e.g., prediction accuracy) on the i-th dataset and rank $d_i$'s based on their absolute value. Let $$z = \frac{T - \frac{1}{4}N(N+1)}{\sqrt{\frac{1}{24}N(N+1)(2N+1)}} \quad (21)$$

where N is the number of datasets, $T=\min(R^+, R^+)$, and

TABLE 4

| Dataset | #training | #testing | #features | Type |
| --- | --- | --- | --- | --- |
| australian | 200 | 490 | 14 | Dense |
| colon | 30 | 32 | 2,000 | Dense |
| duke | 32 | 10 | 7,129 | Dense |
| gisette | 500 | 1,000 | 5,000 | Dense |
| leuk | 38 | 34 | 7,129 | Dense |
| sub-rcv 1 | 500 | 1,000 | 47,236 | Sparse |
| sub-realsim | 500 | 1,000 | 20,958 | Sparse |
| fMRIa | 30 | 10 | 1715 | Dense |
| fMRIb | 30 | 10 | 1874 | Dense |
| fMRIc | 30 | 10 | 1888 | Dense |

$$R^+ = \sum_{d_i > 0} \text{rank}(d_i) + \frac{1}{2} \sum_{d_i = 0} \text{rank}(d_i),$$

-continued $$R^- = \sum_{d_i<0} \text{rank}(d_i) + \frac{1}{2}\sum_{d_i=0} \text{rank}(d_i).$$

Table 6 shows the pair-wise z-values (above diagonal) and the corresponding p-values (below diagonal) of the five compared methods, using Wilcoxon signed-ranks test. At p-value<0.05, there are no significant differences between B-PGH and B-PGH-2 and neither between GCD and ADMM, and any other pair of methods make significant difference.

TABLE 6

| Methods | B-PGH | B-PGH-2 | GCD | ADMM | LIBLINEAR |
|---|---|---|---|---|---|
| B-PGH | — | −0.5096 | −2.6502 | −2.4973 | −2.7521 |
| B-PGH-2 | 0.6102 | — | −2.6502 | −2.0896 | −2.7521 |
| GCD | 0.0080 | 0.0080 | — | −1.4780 | −2.0386 |
| ADMM | 0.0126 | 0.0366 | 0.1394 | — | −2.0386 |
| LIBLINEAR | 0.0060 | 0.0060 | 0.0414 | 0.0414 | — |

The Friedman statistic can be calculated by $$\chi_F^2 = \frac{12N}{K(K+1)}\left[\sum_{j=1}^{K} AR_j - \frac{K(K+1)^2}{4}\right] \quad (22)$$

where K is the number of compared methods, $AR_j = \sum_{i=1}^{n} r_i^j$ denotes the average rank of the j-th method, and $r_i^j$ is the rank of the j-th method on the i-th dataset. Table 7 shows the ranks of the compared methods according to their prediction accuracies on real data sets, where average ranks are applied to ties. The p-value indicates significant difference among the five methods at p-value<0.05.

TABLE 7

|  | B-PGH | B-PGH-2 | GCD | ADMM | LIBLINEAR |
|---|---|---|---|---|---|
| australian | 1.5 | 1.5 | 4 | 3 | 5 |
| colon | 2.5 | 2.5 | 2.5 | 2.5 | 5 |
| duke | 2.5 | 2.5 | 2.5 | 2.5 | 5 |
| gisette | 1 | 2 | 4 | 3 | 5 |
| leuk | 2 | 2 | 4.5 | 4.5 | 5 |
| sub-rcv 1 | 1.5 | 1.5 | 3 | 4 | 5 |
| sub-realsim | 1.5 | 1.5 | 4 | 3 | 5 |
| fMRIa | 1.5 | 1.5 | 4 | 4 | 4 |
| fMRIb | 2 | 2 | 4 | 2 | 5 |
| fMRIc | 1.5 | 1.5 | 4 | 3 | 5 |
| Average rank | 1.75 | 1.85 | 3.65 | 3.15 | 4.6 |

$\chi_F^2$ value = 23.56
p-value = 9.78 × 10⁻⁵

A post-hoc test was also done through Holm's step-down procedure. Assuming the p-values for compared classifiers to the control one are ordered as $p_1 \leq p_2 \leq \ldots \leq p_{K-1}$, Holm's step-down procedure starts from the largest one and compares it to $$\frac{\alpha}{(K-2)},$$

where α is the target p-value. If $$p_1 < \frac{\alpha}{(K-1)},$$

it rejects the corresponding null-hypothesis and compares $p_2$ to $$\frac{\alpha}{(K-2)},$$

and so on. B-PGH is set as the control classifier and $$(R_1 - R_j)\bigg/\sqrt{\frac{K(K+1)}{6N}}$$

to find the p-value for the j-th method compared to the control one. The p-values are 0.8875, 0.0072, 0.0477, and 5.57×10⁻⁵, respectively, for B-PGH-2, GCD, ADMM, and LIBLINEAR. Hence, at α=0.05, B-PGH made significant difference with GCD and LIBLINEAR but not with B-PGH-2 or ADMM, and at α=0.10, B-PGH made significant difference with all other methods except B-PGH-2.

Large-scale real data: This subsection compares B-PGH, GCD and ADMM on two large-scale datasets. The first one is rcv1, part of which has been tested above. It has 20,242 training samples, and each sample has 47,236 features. We use the same 1,000 samples as above for testing. The second dataset contains all the 72,309 samples of realsim, part of which is used above, and each sample has 20,958 features. We randomly selected 20,000 samples for testing and the rest for training. Both of the two datasets are highly sparse. For all algorithms, we fixed b=0 since we observed that using the bias term would affect the prediction accuracy. For B-PGH and GCD, we set δ=1. The best values of $\lambda_1$ and $\lambda_2$ were searched from a large grid by 10-fold cross-validation. The parameters for B-PGH and GCD were set the same as above. ADMM suffered from memory problems since it needs to explicitly form the matrix $X^TX$, which is dense though X is sparse, where the i-th column of X was formed by the i-th data point $x_i$. Hence, we did not report the results of ADMM. The results by B-PGH and GCD are shown in Table 8, where we also report the prediction accuracy by LIBLINEAR for comparison. From the results we can conclude that both or our algorithms, B-PGH and B-PGH-2, are significantly faster (almost 400 times) than the GCD method. In addition, the accuracy of B-PGH and BPGH-2 is very similar to that of GCD.

TABLE 8

| | B-PGH | | | B-PGH-2 | | | GCD | | | LIBLINEAR |
|---|---|---|---|---|---|---|---|---|---|---|
| Dataset | accu (%) | supp. | time | accu (%) | supp. | time | accu (%) | supp. | time | accu (%) |
| rcv1 | 100 | 2188 | 9.72 | 100 | 2159 | 9.54 | 99.7 | 4253 | 8384.57 | 99.5 |
| realsim | 96.7 | 3506 | 16.81 | 96.7 | 3429 | 18.75 | 96.9 | 5092 | 8028.62 | 97.0 |

Effects of the smoothing parameter: We tested how δ affected B-PGH and GCD on the real datasets used above. Since the cost reduction by B-PGH-2 was not significant for these datasets as shown in Table 5, we did not include it in this test. All parameters were set to the same values as above except for δ, which varied between 0.1 and 0.01. The running time and prediction accuracies are shown in Table 9. Comparing the results with those in Table 5, we find that the algorithms tend to give more accurate predictions. However, the accuracy corresponding to δ=0.01 is hardly improved over δ=0.1. In addition, the solutions have more nonzeros, i.e., more features are selected. For these reasons, we do not recommend choosing very small δ. We observed that δ∈[0.1,1] was fine in all our tests. Furthermore, comparing the columns that show the time in Tables 5 and 9 we observe that the efficiency of the GCD method was greatly affected by different values of δ. In most cases, GCD can become significantly slow with small δ's. On the contrary, the efficiency of B-PGH was seldom affected by different values of δ.

$$\Sigma_1 = \begin{bmatrix} \rho 1_{s \times s} + (1-\rho)I_{s \times s} & 0_{s \times (p-s)} \\ 0_{(p-s) \times s} & I_{(p-s) \times (p-s)} \end{bmatrix},$$

$$\Sigma_3 = \begin{bmatrix} I_{\frac{s}{2} \times \frac{s}{2}} & 0_{\frac{s}{2} \times s} & 0_{\frac{s}{2} \times (p-\frac{3s}{2})} \\ 0_{\frac{s}{2} \times s} & \rho 1_{s \times s} + (1-\rho)I_{s \times s} & 0_{s \times (p-\frac{3s}{2})} \\ 0_{(p-\frac{3s}{2}) \times \frac{s}{2}} & 0_{(p-\frac{3s}{2}) \times s} & I_{(p-\frac{3s}{2}) \times (p-\frac{3s}{2})} \end{bmatrix}.$$

This kind of data has been tested above for binary classifications. We took p=500, s=30 and ρ=0, 0.8 in this test. The best parameters for all three models were tuned by first generating 100 training samples and another 100 validation samples. Then we compared the three different models with the selected parameters on 100 randomly generated training samples and 20,000 random testing samples. The comparison was independently repeated 100 times. The performance of different models and algorithms were measured by prediction accuracy, running time (sec), the number

TABLE 9

| | δ = 0.1 | | | | | | δ = 0.01 | | | | | |
|---|---|---|---|---|---|---|---|---|---|---|---|---|
| | B-PGH | | | GCD | | | B-PGH | | | GCD | | |
| Dataset | accu (%) | supp | time | accu (%) | supp | time | accu (%) | supp | time | accu (%) | supp | time |
| australian | 85.3 | 11 | 0.01 | 85.3 | 11 | 0.12 | 85.5 | 11 | 0.01 | 86.1 | 11 | 0.24 |
| colon | 84.4 | 109 | 0.07 | 84.4 | 106 | 1.16 | 84.4 | 123 | 0.14 | 84.4 | 118 | 4.98 |
| duke | 90 | 147 | 0.30 | 90 | 158 | 4.98 | 90 | 344 | 0.40 | 90 | 181 | 10.3 |
| gisette | 93.1 | 1394 | 2.74 | 93.2 | 1525 | 4.83 | 93.0 | 2781 | 3.25 | 92.7 | 1788 | 19.2 |
| leuk | 91.2 | 1006 | 0.57 | 88.2 | 748 | 18.5 | 91.2 | 3678 | 0.65 | 91.2 | 970 | 18.5 |
| sub-rcv1 | 85.1 | 1040 | 0.03 | 85.1 | 1040 | 4.71 | 85.1 | 1040 | 1.16 | 85.1 | 1040 | 10.7 |
| sub-realsim | 93.2 | 1145 | 0.02 | 93.2 | 1145 | 3.07 | 93.2 | 1145 | 0.03 | 93.2 | 1145 | 8.92 |
| fMRIa | 90 | 156 | 0.18 | 80 | 149 | 28.35 | 90 | 237 | 0.28 | 90 | 217 | 28.35 |
| fMRIb | 100 | 1335 | 0.26 | 80 | 386 | 2.27 | 100 | 1874 | 0.23 | 100 | 1399 | 1.48 |
| fMRIc | 100 | 1856 | 0.21 | 100 | 1269 | 2.19 | 100 | 1888 | 0.24 | 100 | 1888 | 2.56 |

Multi-Class SVM

This subsection tests the performance of M-PGH for solving expression (3) on a synthetic dataset, eight benchmark datasets, and also two microarray datasets. The parameters of M-PGH were set in the same way as those of B-PGH except we set $$L_0 = \frac{L_m}{nJ},$$

where $L_m$ is given in expression (13). For all the tests, δ=1 was set in (3).

Synthetic data: We compare (3), the $l_1$-regularized M-SVM, and the $l_\infty$-regularized M-SVM on a four-class example with each sample in p-dimensional space. The data in class j was generated from the mixture Gaussian distribution $\mathcal{N}(\mu_j, \Sigma_j)$, j=1, 2, 3, 4. The mean vectors and covariance matrices are $\mu_2 = -\mu_1$, $\mu_4 = -\mu_3$, $\Sigma_2 = \Sigma_1$, $\Sigma_4 = \Sigma_3$, which take the form of $$\mu_1 = \left( \underbrace{1, \ldots, 1}_{s}, \underbrace{0, \ldots, 0}_{p-s} \right)^T,$$

$$\mu_3 = \left( \underbrace{0, \ldots, 0}_{s/2}, \underbrace{1, \ldots, 1}_{s}, \underbrace{0, \ldots, 0}_{p-3s/2} \right)^T,$$

of incorrect zeros (IZ), the number of nonzeros in each column (NZ1, NZ2, NZ3, NZ4).

Table 10 summarizes the average results, where we can see that M-PGH is very efficient in solving expression (3). In addition we observe that (3) tends to give the best predictions.

TABLE 10

| models | accu. (%) | time | IZ | NZ1 | NZ2 | NZ3 | NZ4 |
|---|---|---|---|---|---|---|---|
| ρ = 0 | | | | | | | |
| (3) by M-PGH | 96.7 (0.007) | 0.017 | 29.43 | 28.59 | 29.19 | 28.78 | 29.14 |
| $l_1$-regularized by Sedumi | 83.0 (0.018) | 3.56 | 59.6 | 29.3 | 28.7 | 29.3 | 28.9 |
| $l_\infty$-regularized by Sedumi | 84.0 (0.019) | 20.46 | 33.2 | 49.3 | 49.3 | 49.3 | 49.3 |
| ρ = 0.8 | | | | | | | |
| (3) by M-PGH | 78.4 (0.020) | 0.021 | 35.15 | 26.93 | 27.29 | 26.41 | 26.75 |
| $l_1$-regularized by Sedumi | 64.8 (0.024) | 3.50 | 91.6 | 16.4 | 17.1 | 17.2 | 16.4 |
| $l_\infty$-regularized by Sedumi | 67.2 (0.015) | 20.64 | 74.1 | 46.1 | 46.1 | 46.1 | 46.1 |

Benchmark data: In this subsection, we compare M-PGH to two popular methods for multi-category classification by binary classifier. The first one is the "one-vs-all" (OVA) method coded in the LIBLINEAR library and the other one the Decision Directed Acyclic Graph (DDAG) method. We compared them on eight sets of benchmark data, all of which are available from the LIBSVM dataset. The problem statistics are shown in Table 11. The original dataset of connect4 has 67,557 data points. We randomly chose 500 for training and 1,000 for testing. All 2,000 data points in the training set of dna were used, and we randomly chose 500 for training and the rest for testing. glass has 214 data points, and we randomly chose 164 for training and another 50 for testing. For letter, we randomly picked 1300 out of the original 15,000 training samples with 50 for each class for training and 500 out of the original 5,000 testing points for testing. The poker dataset has 25,010 training and 1 million testing data points. For each class, we randomly selected 50 out of each class for training except the 6th through 9th classes which have less than 50 samples and hence were all used. In addition, we randomly chose 100 k points from the testing set for testing. protein has 17,766 training data points and 6,621 testing points. We randomly chose 1,500 from the training dataset for training and all the points in the testing dataset for testing. usps is a handwritten digit dataset consisting of 7291 training and 2007 testing digits from 0 to 9. We randomly picked 50 with 5 for each class out of the training set for training and 500 out of the testing set for testing. wine has 128 data points, and we randomly chose 50 for training and the rest for testing.

TABLE 11

| dataset | #training | #testing | #feature | #class |
|---------|-----------|----------|----------|--------|
| connect4 | 500 | 1000 | 126 | 3 |
| dna | 500 | 1500 | 180 | 3 |
| glass | 164 | 50 | 9 | 6 |
| letter | 1300 | 500 | 16 | 26 |
| poker | 352 | 100k | 10 | 10 |
| protein | 1500 | 6621 | 357 | 3 |
| usps | 50 | 500 | 256 | 10 |
| wine | 50 | 128 | 13 | 3 |

We fixed $\lambda_3=1$ in (3) for M-PGH and tuned $\lambda_1,\lambda_2$. DDAG has two parameters C, γ, which were tuned from a large grid of values. The parameters for OVA were set to their default values in the code of LIBLINEAR. We did the tests for 10 times independently. The average prediction accuracies by the three different methods are reported in Table 12. From the results, we see that M-PGH performs consistently better than OVA except for letter and also comparable with DDAG. When the training samples are sufficiently many, DDAG can give higher prediction accuracies such as for glass and letter. However, it can perform badly if the training samples are few compared to the feature numbers such as for dna and also the tests in the next subsection.

TABLE 12

| dataset | M-PGH | OVA | DDAG |
|---------|-------|-----|------|
| connect4 | 53.28 | 51.20 | 53.07 |
| dna | 92.82 | 89.04 | 33.71 |
| glass | 53.00 | 51.40 | 62.80 |
| letter | 43.24 | 65.90 | 80.96 |
| poker | 35.13 | 14.29 | 24.05 |
| protein | 60.22 | 56.84 | 53.20 |
| usps | 74.44 | 73.46 | 76.28 |
| wine | 96.64 | 96.25 | 94.00 |

Application to microarray classification: This subsection applies M-PGH to microarray classifications. Two real data sets were used. One is the children cancer data set, which used cDNA gene expression profiles and classified the small round blue cell tumors (SRBCTs) of childhood into four classes: neuroblastoma (NB), rhabdomyosarcoma (RMS), Burkitt lymphomas (BL) and the Ewing family of tumors (EWS). The other is a leukemia data set that used gene expression monitoring and classified the acute leukemias into three classes: B-cell acute lymphoblastic leukemia (B-ALL), T-cell acute lymphoblastic leukemia (TALL) and acute myeloid leukemia (AML). The original distributions of the two data sets are given in Table 13. Both the two data sets have been tested before on certain M-SVMs for gene selection.

TABLE 13

| Data set | SRBCT | | | | | leukemia | | | |
|---|---|---|---|---|---|---|---|---|---|
| | NB | RMS | BL | EWS | total | B-ALL | T-ALL | AML | total |
| Training | 12 | 20 | 8 | 23 | 63 | 19 | 8 | 11 | 38 |
| Testing | 6 | 5 | 3 | 6 | 20 | 19 | 1 | 14 | 34 |

Each observation in the SRBCT dataset has dimension of p=2308, namely, there are 2308 gene profiles. We first standardized the original training data in the following way. Let $X^o=[x_1^o, \ldots, x_n^o]$ be the original data matrix. The standardized matrix X was obtained by $$x_{gj} = \frac{x_{gj}^o - \text{mean}(x_{g1}^o, \ldots, x_{gn}^o)}{\text{std}(x_{g1}^o, \ldots, x_{gn}^o)}, \forall g, j.$$

Similar normalization was done to the original testing data. Then we selected the best parameters of each model by three-fold cross validation on the standardized training data. Finally, we put the standardized training and testing data sets together and randomly picked 63 observations for training and the remaining 20 ones for testing. The average prediction accuracy, running time (sec), number of nonzeros (NZ) and number of nonzero rows (NR) of 100 independent trials are reported in Table 14, from which we can see that all models give similar prediction accuracies. The $l_\infty$-regularized M-SVM gives denser solutions, and M-PGH is much faster than Sedumi.

The leukemia data set has p=7,129 gene profiles. We standardized the original training and testing data in the same way as that in last test. Then we ranked all genes on the standardized training data. Specifically, let $X=[x_1, \ldots, x_n]$ be the standardized data matrix. The relevance measure for gene g is defined as follows:

$$R(g) = \frac{\Sigma_{i,j} I(y_i = j)(m_g^j - m_g)}{\Sigma_{i,j} I(y_i = j)(x_{gi} - m_g^j)}, g = 1, \ldots, p,$$

where $m_g$ denotes the mean of $\{x_{g1}, \ldots, x_{gn}\}$ and $m_g^j$ denotes the mean of $\{x_{gi}:y_i=j\}$. According to R(g), we selected the 3,571 most significant genes. Finally, we put the processed training and testing data together and randomly chose 38 samples for training and the remaining ones for testing. The process was independently repeated 100 times. We compared all the above five different methods for M-SVMs. Table 14 summarizes the average results, which show that M-PGH is significantly faster than Sedumi and that model (3) gives comparable prediction accuracies with relatively denser solutions. In addition, we note that DDAG performs very badly possibly because the training samples are too few.

TABLE 14

| Problems | SRBCT | | | | leukemia | | | |
|---|---|---|---|---|---|---|---|---|
| | accu. (%) | time | NZ | NR | accu. (%) | time | NZ | NR |
| (3) by M-PGH | 98.6 (0.051) | 0.088 | 220.44 | 94.43 | 91.9 (0.049) | 0.241 | 457.02 | 218.25 |
| $l_1$-regularized by Sedumi | 98.9 (0.022) | 13.82 | 213.67 | 96.71 | 85.2 (0.063) | 11.21 | 82.41 | 40.00 |
| $l_\infty$-regularized by Sedumi | 97.9 (0.033) | 120.86 | 437.09 | 109.28 | 85.2 (0.063) | 169.56 | 82.41 | 40.00 |
| OVA | 96.2 | — | — | — | 81.5 | — | — | — |
| DDAG | 72.0 | — | — | — | 47.1 | — | — | — |

Statistical comparison: As above, we also performed statistical comparison of M-PGH, OVA, and DDAG on the eight benchmark and two microarray datasets. Table 15 shows their z-values and corresponding p-values of the Wilcoxon signed-rank test. From the table, we see that there is no significant difference between any pair of the three methods at p-value<0.05. However, M-PGH makes significant difference with OVA at p-value<0.10. Average ranks of M-PGH, OVA, and DDAG according to their prediction accuracies on the eight bench-mark and two microarray datasets are shown in Table 16 together with the Friedman statistic and p-value. Again, we see that there is no significant difference among the three methods at p-value<0.05 but there is at p-value<0.10. We further did a post-hoc test using the Holm's stepdown procedure as above. M-PGH was set as the control classifier. The p-values are 0.0253 and 0.0736, respectively, for OVA and DDAG. Hence, MPGH made significant differences with OVA and DDAG at p-value=0.10.

TABLE 15

| Methods | M-PGH | OVA | DDAG |
|---|---|---|---|
| M-PGH | — | −1.7838 | −1.2741 |
| OVA | 0.0745 | — | −0.5606 |
| DDAG | 0.2026 | 0.5751 | — |

TABLE 16

| | Methods | | |
|---|---|---|---|
| | M-PGH | OVA | DDAG |
| Average rank | 1.4 | 2.4 | 2.2 |

$\chi_F^2$ value = 5.6,
p-value = .0608

CONCLUSIONS

SVMs have been popularly used to solve a wide variety of classification problems. The original SVM model uses the non-differentiable hinge loss function, which together with some regularizers like $l_1$-term makes it difficult to develop simple yet efficient algorithms. We considered the huberized hinge loss function that is a differentiable approximation of the original hinge loss. This allowed us to apply PG method to both binary-class and multi-class SVMs in an efficient and accurate way. In addition, we presented a two-stage algorithm that is able to solve very large-scale binary classification problems. Assuming strong convexity and under fairly general assumptions, we proved the linear convergence of PG method when applied in solving composite problems in the form of (4), special cases of which are the binary and multi-class SVMs. We performed a wide range of numerical experiments on both synthetic and real datasets, demonstrating the superiority of the proposed algorithms over some state-of-the-art algorithms for both binary and multi-class SVMs. In particular for large-scale problems, our algorithms are significantly faster than compared methods in all cases with comparable accuracy. Finally, our algorithms are more robust to the smoothing parameter $\delta$ in terms of CPU time.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including" "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

What is claimed is:
1. A computer-implemented method comprising:
  receiving, by a processor, medical image data;
  training a machine learning model for classifying the medical image data, wherein the machine learning model is generated at least in part by:
    replacing a hinge loss term of a support vector machine model of a classifier with a differentiable approximation of the hinge loss term based on a Huber loss function, to produce the machine learning model, wherein a vicinity near a non-smooth point in the hinge loss term of the support vector machine model is approximated by a differentiable curve in the Huber loss function;
    applying a proximal gradient method to solve the differentiable support vector machine model, to produce updates for an algorithm for determining a separating hyperplane of the differentiable support vector machine model; and determining the separating hyperplane using the algorithm;

extracting characteristics of the medical image data to form a feature vector; and determining one or more medical conditions associated with the medical image data by processing the feature vector using the machine learning model.

2. The method of claim 1, wherein the Huber loss function is defined by $$\phi_H(t) = \begin{cases} 0, & \text{for } t > 1, \\ \frac{(1-t)^2}{2\delta}, & \text{for } 1-\delta < t \le 1, \\ 1-t-\frac{\delta}{2} & \text{for } t \le 1-\delta, \end{cases}$$

where $\delta$ defines a vicinity around a non-differentiable point of the hinge loss term; and t is representative of a data item vector and its associated labels.

3. The method of claim 1, wherein the support vector machine classifier is a binary support vector machine classifier.

4. The method of claim 1, wherein the support vector machine classifier is a multi-class support vector machine classifier.

5. A computer-implemented method for training a binary support vector machine classifier for classifying data items with high dimensionality, comprising:

receiving a set of n data items $x=x_1, x_2, \ldots, x_n$, each data item being a vector with dimensionality m and associated labels $y_1 \in \{+1, -1\}$, a plurality of support vector machine tuning parameters $\lambda_1, \lambda_2, \lambda_3$ and a parameter $\delta$ defining a vicinity around a non-differentiable point of a hinge loss function is approximated by a quadratic smooth function, wherein the set of n data items comprises medical images;

training the binary support vector machine classifier for classifying data items with high dimensionality at least in part by:

computing a constant $L_f$ such that the loss function of the binary support vector machine classifier is Lipschitz continuous;

solving for a maximum margin separating hyperplane $u^* = (b^*, w^*)$ of the classifier by minimizing a function of the data items x and associated labels y:

$$\min_{b,w} \frac{1}{n} \sum_{i=1}^{n} \phi_H(y_i(b + x_i^T w)) + \lambda_1 \|w\|_1 + \frac{\lambda_2}{2} \|w\|_2^2 + \frac{\lambda_3}{2} b^2,$$

where $\phi_H$ is a Huberized hinge loss function having values defined by $$\phi_H(t) = \begin{cases} 0, & \text{for } t > 1, \\ \frac{(1-t)^2}{2\delta}, & \text{for } 1-\delta < t \le 1, \\ 1-t-\frac{\delta}{2} & \text{for } t \le 1-\delta; \end{cases}$$

where $\delta$ defines a vicinity around a non-differentiable point of the hinge loss term;

w is a slope of the separating hyperplane;

b is a bias of the separating hyperplane;

and t is representative of one of the set n of data items and the associated labels:

the minimizing comprising executing successive iterations k, each iteration resulting in a hyperplane $u^k$ closer to the maximum margin separating hyperplane $u^*$ than a previously found separating hyperplane $u^{k-1}$, each iteration comprising:

computing $\hat{u}^{k-1} = u^{k-1} + \omega_{k-1}(u^{k-1} - u^{k-2})$ wherein $\hat{u}$ is an intermediate hyperplane defined as a linear combination of hyperplanes found in two previous iterations and $\omega_{k-1} \le 1$ is a weight given to hyperplane definitions of two immediately previous iterations;

updating a Lipschitz constant $L_k$ as $\min(\eta^{n_k} L_{k-1}, L_f)$, where $\eta > 1$ is a preselected counter, and $n_k$ is an integer computed to guarantee monotonic decrease of the hinge loss function and leads to convergence of the successive iterations;

updating the hyperplane $u^k$ as $$\begin{cases} b^k = \dfrac{L_k \hat{b}^{k-1} - \nabla_b f(\hat{u}^{k-1})}{L_k + \lambda_3}, \\ w^k = \dfrac{1}{L_k + \lambda_2} S_{\lambda_1}(L_k \hat{w}^{k-1} - \nabla_w f(\hat{u}^{k-1})) \end{cases},$$

wherein the function $f$ is defined by:

$$f_i(b, w) = \phi_H(y_i(b + x_i^T w)), \text{ for } i = 1, \ldots, n,$$

$$f(b, w) = \frac{1}{n} \sum_{i=1}^{n} f_i(b, w),$$

and wherein $S_{\lambda_1}$ is a component-wise shrinkage operator, and $\hat{b}$ and $\hat{w}$ are a bias and a slope of the intermediate hyperplane definition $\hat{u}$; and re-updating $u^k$ with $\hat{u}^{k-1} = u^{k-1}$ only if $F(u^k) > F(u^{k-1})$, where F is defined as a function whereby $$\min_{b,w} F(b, w) \equiv f(b, w) + g(b, w) \text{ where}$$

$$g(b, w) = \lambda_1 \|w\|_1 + \frac{\lambda_2}{2} \|w\|^2 + \frac{\lambda_3}{2} b^2.$$

extracting characteristics of the medical images to form a feature vector; and determining one or more medical conditions associated with the medical images by processing the feature vector using the binary support vector machine classifier.

6. The method of claim 5, wherein the support vector machine tuning parameters comprise an $L_1$-norm loss function coefficient $\lambda_1$, an $L_2$-norm loss function coefficient $\lambda_2$, and a bias coefficient $\lambda_3$.

7. The method of claim 5, wherein the plurality of support vector machine tuning parameters are determined using cross validation.

8. The method of claim 5, wherein computing a constant $L_f$ further comprises evaluating $$L_f = \frac{1}{n\delta}\sum_{i=1}^{n} y_i^2(1 + \|x_i\|^2).$$

9. The method of claim 5, wherein $n_k$ is a smallest integer such that the following condition is satisfied:

$$f(prox_{h_k}(v^{k-1})) \leq$$
$$f(\hat{u}^{k-1}) + \langle \nabla f(\hat{u}^{k-1}), prox_{h_k}(v^{k-1}) - \hat{u}^{k-1} \rangle + \frac{L_k}{2}\|prox_{h_k}(v^{k-1}) - \hat{u}^{k-1}\|^2,$$

where $$h_k(u) = \frac{1}{L_k}g(u), \quad v^{k-1} = \hat{u}^{k-1} - \frac{1}{L_k}\nabla f(\hat{u}^{k-1}),$$
$$\hat{u}^{k-1} = u^{k-1} + \omega_{k-1}(u^{k-1} - u^{k-2})$$

for some weight $\omega_{k-1} \leq 1$, and $v_i = (y_i; y_i x_i)$.

10. The method of claim 9, wherein $\mathcal{S}$ is defined by $$\mathcal{S}_v(t) = \text{sign}(t)\max(|t|-v, 0).$$

11. The method of claim 5, wherein each of the successive iterations k further comprises:
    storing $Vu^{k-1}$ and $Vu^k$ where $V=(v_1, \ldots, v_n)^T$ and $v_i=(y_i; y_i x_i)$;
    obtaining $V\hat{u}^k = Vu^k + \omega_k(Vu^k - Vu^{k-1})$; and
    computing $\nabla f(\hat{u}^{k-1})$ and evaluating $F(u^k)$ using $V\hat{u}^k$.

12. The method of claim 5, further comprising:
    before solving for a separating hyperplane u*, executing successive iterations k with $L_k = L_f$ until $w^k$ remains substantially unchanged, the iterations comprising:
    computing $\hat{u}^{k-1} = u^{k-1}$;
    updating the hyperplane $u^k$ as $$\begin{cases} b^k = \dfrac{L_k \hat{b}^{k-1} - \nabla_b f(\hat{u}^{k-1})}{L_k + \lambda_3} \\ w^k = \dfrac{1}{L_k + \lambda_2} S_{\lambda_1}(L_k \hat{w}^{k-1} - \nabla_w f(\hat{u}^{k-1})) \end{cases} ; \text{ and}$$

and
    re-updating $u^k$ with $\hat{u}^{k-1} = u^{k-1}$ only if $F(u^k) > F(u^{k-1})$;
    defining a lower-dimensional w by confining w to those elements for which support is substantially greater than 0; and
    performing the step of solving for a separating hyperplane u* with the lower-dimensional w.

13. A computer-implemented method for training a multi-class support vector machine classifier for classifying data items with high dimensionality, comprising:
    receiving a set of n data items $x = x_1, x_2, \ldots, x_n$, each data item being a vector with dimensionality m and associated labels $y_i \in \{1 \ldots, J\}$, a plurality of support vector machine tuning parameters $\lambda_1, \lambda_2, \lambda_3$ and a parameter $\delta$ defining a vicinity around a non-differentiable point of a hinge loss function is approximated by a quadratic smooth function, wherein the set of n data items comprises medical images;
    training the multi-class support vector machine classifier for classifying data items with high dimensionality at least in part by:

computing a constant $L_m$ such that the loss function of the multi-class support vector machine classifier is Lipschitz continuous;
solving for a separating hyperplane U*=(b*, W*) of the classifier by minimizing a function of the data items x and associated labels y:

$$\min_{b,W} \frac{1}{n}\sum_{i=1}^{n}\sum_{j=1}^{J} a_{ij}\phi_H(b_j + x_i^T w_j) + \lambda_1\|W\|_1 + \frac{\lambda_2}{2}\|W\|_F^2 + \frac{\lambda_3}{2}\|b\|^2,$$

s.t. $We = 0$, $e^T b = 0$, where $\phi_H$ is a Huberized hinge loss function having values defined by $$\phi_H(t) = \begin{cases} 0, & \text{for } t > 1, \\ \dfrac{(1-t)^2}{2\delta}, & \text{for } 1-\delta < t \leq 1, \\ 1 - t - \dfrac{\delta}{2} & \text{for } t \leq 1 - \delta; \end{cases}$$

where $\delta$ defines a vicinity around a non-differentiable point of the hinge loss term;
W is a slope of the separating hyperplane;
b is a bias of the separating hyperplane;
and
t is representative of one of the set n of data items and the associated labels;
and where $\|W\|_1 = \Sigma_{i,j}|w_{i,j}|$, $a_{ij}=1$ if $y_i \neq j$ and $a_{ij}=0$ otherwise, e denotes a vector with all one's, and $w_j$ denotes the j-th column of W;
    the minimizing comprising executing successive iterations k, each iteration resulting in a hyperplane $U^k$ closer to a maximum margin separating hyperplane U* than a previously found separating hyperplane $U^{k-1}$, each iteration comprising:
        computing $\hat{U}^{k-1} = U^{k-1} + \omega_{k-1}(U^{k-1} - u^{k-2})$ wherein $\hat{U}$ is an intermediate hyperplane defined as a linear combination of hyperplanes found in two previous iterations and $\omega_{k-1} \leq 1$ is a weight given to hyperplane definitions of two immediately previous iterations;
        updating a Lipschitz constant $L_k$ as $\min(\eta^{n_k} L_{k-1}, L_f)$, where $\eta > 1$ is a preselected counter, and $n_k$ is an integer computed to guarantee monotonic decrease of the hinge loss function and leads to convergence of the successive iterations;
        updating $b^k$ as $P\bar{b}^k$ wherein $$P = \begin{bmatrix} I \\ -e^T \end{bmatrix} \in \mathbb{R}^{J \times (J-1)},$$

I denotes an identity matrix and $\bar{b} \in \mathbb{R}^{J-1}$;
updating each row i of $W^k$ by solving $$\min_w \frac{1}{2}\|w - z\|^2 + \lambda\|w\|_1, \text{ s.t. } e^T w = 0,$$

s.t. $e^T w=0$, where $$\lambda = \frac{\lambda_1}{L_k + \lambda_2}$$

and $z^T$ is the i-th row-vector of the matrix $$\frac{L_k}{L_k+\lambda_2}\hat{W}^{k-1} - \frac{1}{L_k+\lambda_2}\nabla_W l_M(\hat{U}^{k-1})$$

and $l_M$ is a loss function $1/n\Sigma_{i=1}^n \Sigma_{j=1}^J a_{ij}\phi_H(b_j x_i^T w_j)$; and re-updating $b^k$ and $W^k$ with $\hat{U}^{k-1}=U^{k-1}$ only if $H(U^k)>H(U^{k-1})$, where H is defined as a function whereby $$\frac{1}{n}\sum_{i=1}^{n}\sum_{j=1}^{J} a_{ij}\phi_H(b_j + x_i^T w_j);$$

where $$G(U) = \lambda_1\|W\|_1 + \frac{\lambda_2}{2}\|W\|_F^2 + \frac{\lambda_3}{2}\|b\|^2$$

and $\mathcal{U} = \{(b,W): We=0, e^T b=0\}$;
extracting characteristics of the medical images to form a feature vector; and
determining one or more medical conditions associated with the medical images by processing the feature vector using the multi-class support vector machine classifier.

14. The method of claim 13, wherein updating each row i of $W^k$ by solving $$\min_w \frac{1}{2}\|w-z\|^2 + \lambda\|w\|_1$$

further comprises, for each row i of $W^k$:
setting a variable z to the i-th row of $$\frac{L_k}{L_k+\lambda_2}\hat{W}^{k-1} - \frac{1}{L_k+\lambda_2}\nabla_W l_M(\hat{U}^{k-1});$$

determining a $\sigma$ to maximize
$\gamma(\sigma)=\frac{1}{2}\|\mathcal{S}_\lambda(z-\sigma)-z\|^2+\lambda\|\mathcal{S}_\lambda(z-\sigma)\|_1+\sigma e^T \mathcal{S}_\lambda(z-\sigma)$,
where $\mathcal{S}_\lambda$ is a component-wise shrinkage operator;

setting $\sigma^*=\sigma$, and
setting the i-th row of $W^k$ to be $\mathcal{S}_\lambda(z-\sigma^*)$.

15. The method of claim 14, wherein determining a $\sigma$ to maximize $\gamma(\sigma)=\frac{1}{2}\|\mathcal{S}_\lambda(z-\sigma)-z\|^2+\lambda\|\mathcal{S}_\lambda(z-\sigma)\|_1+\sigma e^T \mathcal{S}_\lambda(z-\sigma)$ further comprises:
setting $v=[z-\lambda; z+\lambda]\in\mathbb{R}^{2J}$;
sorting v as $v_1 \le v_2 \le \ldots \le v_{2J}$;
setting I=J;
repeating the following until $\gamma'(v_I)\cdot\gamma'(v_{I+1})\le 0$:
if $\gamma'(v_I)>0$, then setting I=I+1;
if $\gamma'(v_I)\le 0$; then setting I=I-1
solving $\gamma'(\sigma)=0$ within $[v_I,v_{I+1}]$ and output the solution $\sigma^*$.

16. The method of claim 13, wherein the support vector machine tuning parameters comprise an $L_1$-norm loss function coefficient $\lambda_1$, an $L_2$-norm loss function coefficient $\lambda_2$, and a bias coefficient $\lambda_3$.

17. The method of claim 13, wherein the plurality of support vector machine tuning parameters are determined using cross validation.

18. The method of claim 13, wherein computing a constant $L_m$ further comprises evaluating $$L_m = \frac{J}{n\delta}\sum_{i=1}^{n}(1+\|x_i\|^2).$$

19. The method of claim 13, wherein each of the successive iterations k further comprises:
storing $VU^{k-1}$ and $VU^k$ where $V=(v_1, \ldots, v_n)^T$ and $v_i=(y_i; y_i x_i)$;
obtaining $\widetilde{VU}^k=VU^k+\omega_k(VU^k-VU^{k-1})$; and
computing $\nabla l_M(\hat{U}^{k-1})$ and evaluating $H(U^k)$ using $\widetilde{VU}^k$.

20. The method of claim 13, further comprising:
before solving for a separating hyperplane U*, executing successive iterations k with $L_k=L_m$ until $W^k$ remains substantially unchanged, the iterations comprising:
computing $\hat{U}^{k-1}=U^{k-1}$;
updating $b^k$ as $P\bar{b}^k$;
updating each row i of $W^k$ by solving $$\min_w \frac{1}{2}\|w-z\|^2 + \lambda\|w\|_1, \text{ s.t. } e^T w = 0;$$

; and
re-updating $b^k$ and $W^k$ with $\hat{U}^{k-1}=U^{k-1}$ only if $H(U^k)>H(U^{k-1})$;
defining a lower-dimensional W by confining W to those elements for which support is substantially greater than 0; and
performing the step of solving for a separating hyperplane U* with the lower-dimensional W.

* * * * *